US012724798B2

(12) United States Patent
Batra et al.

(10) Patent No.: US 12,724,798 B2
(45) Date of Patent: Sep. 1, 2026

(54) COMPUTING DEVICES, SYSTEMS, AND GRAPHICAL USER INTERFACES FOR FEATURE GENERATION USING UNSTRUCTURED DATA

(71) Applicant: SAS Institute Inc., Cary, NC (US)

(72) Inventors: Saurabh Batra, Dubai Media City (AE); Dwijendra Dwivedi, Dubai Media City (AE)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 19/087,745

(22) Filed: Mar. 24, 2025

(65) Prior Publication Data

US 2026/0105073 A1 Apr. 16, 2026

Related U.S. Application Data

(60) Provisional application No. 63/721,944, filed on Nov. 18, 2024, provisional application No. 63/708,151, filed on Oct. 16, 2024.

(51) Int. Cl.
*G06F 16/28* (2019.01)
*G06F 21/62* (2013.01)

(52) U.S. Cl.
CPC ........ *G06F 16/287* (2019.01); *G06F 21/6227* (2013.01)

(58) Field of Classification Search
CPC .......................... G06F 21/6227; G06F 16/287
See application file for complete search history.

(56) References Cited

U.S. PATENT DOCUMENTS 5,091,777 A 2/1992 Gleason
6,988,084 B1 1/2006 DiBacco
8,219,469 B2 7/2012 Naccache
11,139,961 B2 * 10/2021 Baracaldo Angel ... G06N 3/045
11,704,785 B2 7/2023 Wheaton et al.
(Continued)

FOREIGN PATENT DOCUMENTS

WO WO-2016160539 A1 * 10/2016 ............ G06Q 40/03

OTHER PUBLICATIONS

Dwivedi, D. et al. “Chapter 23 Risk Scorecards Using Alternative Sources of Data for Credit Risk Applications”, 2024, pp. 301-315.

*Primary Examiner* — Sherief Badawi
*Assistant Examiner* — J Mitchell Curran
(74) *Attorney, Agent, or Firm* — COATS & BENNETT, PLLC

(57) ABSTRACT

A computing system generates a feature for a machine learning model by receiving identification of character data. The character data is stored in a database comprising multiple documents. One or more documents of the multiple documents pertain to a respective entity of multiple entities. The computing system generates structured data from the character data by generating multiple structured data terms; and storing the multiple structured data terms in respective data elements of multiple memory blocks in memory of the computing system. The computing system generates the feature for the machine learning model based on one or more of: at least two structured data terms in different memory blocks of the multiple memory blocks; and data manipulation of a structured data term in a memory block of the multiple memory blocks.

30 Claims, 43 Drawing Sheets

(56) References Cited

U.S. PATENT DOCUMENTS

| | | | | |
|---|---|---|---|---|
| 11,810,204 | B2 | 11/2023 | Juban et al. | |
| 11,922,496 | B2 | 3/2024 | Rose et al. | |
| 12,118,492 | B2 | 10/2024 | Girdhar et al. | |
| 2003/0074288 | A1 | 4/2003 | Quine | |
| 2014/0129561 | A1 | 5/2014 | Kern et al. | |
| 2018/0308160 | A1* | 10/2018 | Liu | G06Q 40/03 |
| 2021/0150432 | A1 | 5/2021 | Rosenberg et al. | |
| 2021/0406772 | A1* | 12/2021 | Shillingford | G06F 40/169 |
| 2022/0083561 | A1* | 3/2022 | Shillingford | G06F 40/30 |
| 2022/0253464 | A1* | 8/2022 | Sloane | G06F 16/1805 |
| 2024/0054243 | A1* | 2/2024 | Page | G06F 21/6227 |
| 2024/0134884 | A1* | 4/2024 | Xue | G06F 16/23 |
| 2024/0202220 | A1* | 6/2024 | Arikapudi | G06F 16/3322 |

* cited by examiner 700
receive request for executing a project
702
receive
request for grid
computing environment to
execute project?
704
initiate and execute project in gridded
environment & perform data analysis
706
transmit results of analysis
708
initiate and execute project in solo
environment
710
provide results of project
712

900
instantive event stream processing engine 900
create engine container 902
instantiate continuous queries 904
initialize publish/subscribe capability 906
start projects 908
receive event block 910
process event block 912
output processed event block 914
stop processing? 916
no
yes
stop projects 918
shutdown 920

1202
1204
1206
1208
1277
1222
1255
neural network
1200
routine(s) 1244
or
neuromorphic device(s) 1250
storage
interface
1299
neural network
configuration data
1293

1300
node device 1330
VM 1331
container 1336
executable routine(s) 1334
node device 1330
VM 1331
container 1336
executable routine(s) 1334
control routine(s) 1354
container 1356
VM 1351
control device 1350
1399
requesting device(s) 1370

1800

| S.No. 1801 | Variable Name 1802 | Variable Description 1803 |
|---|---|---|
| 1 | ID | Unique ID |
| 2 | age | Age of the customer |
| 3 | salary | Salary of the customer |
| 4 | dbr1 | DBR ratio |
| 5 | own_car_flag | Customer owns a car flag |
| 6 | self_employed_flag | Customer is self employed flag |
| 7 | years_of_experience | Years of work experience |
| 8 | own_house_flag | Customer owns a house flag |
| 9 | num_of_card | Number of cards used by the customer |
| 10 | target1 | 90 DPD in 12 months |
| 11 | target2 | 60 DPD in 12 months |
| 12 | target3 | 30 DPD in 12 months |

| Variable ID 1851 | Variable 1852 | Coefficient 1853 |
|---|---|---|
| V1 | age | 0.7409455 |
| V2 | salary | 0.782088 |
| V3 | dbr - calculated | 1.025067 |
| V4 | own_car_flag | 0.287018 |
| V5 | self_employed_flag | 0.701793 |
| V6 | years_of_experience | 0.663872 |

AUC (Development sample) = 0.82

AUC (Validation sample) = 0.82

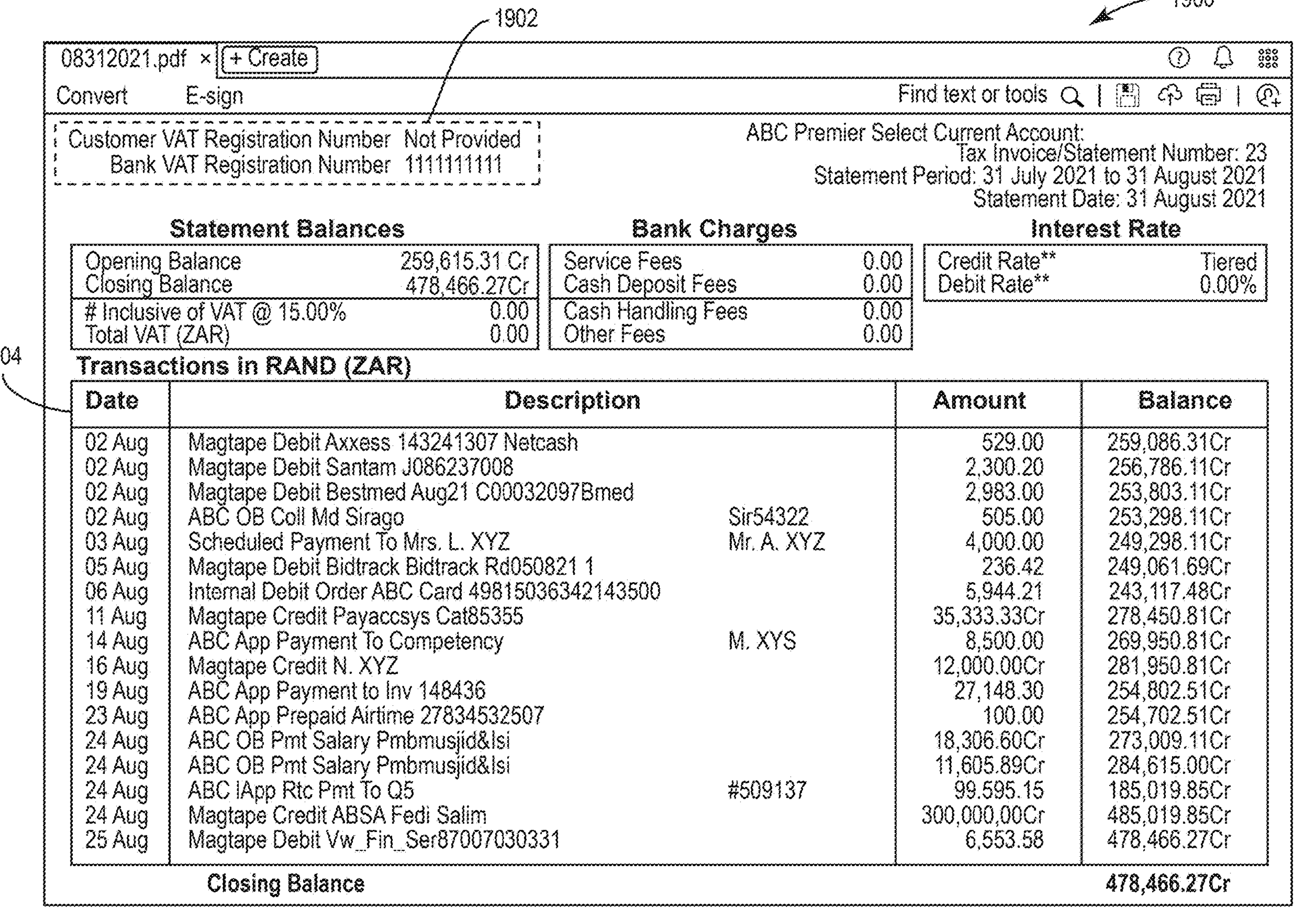

| Date | Description | | Amount | Balance |
|---|---|---|---|---|
| 02 Aug | Magtape Debit Axxess 143241307 Netcash | | 529.00 | 259,086.31Cr |
| 02 Aug | Magtape Debit Santam J086237008 | | 2,300.20 | 256,786.11Cr |
| 02 Aug | Magtape Debit Bestmed Aug21 C00032097Bmed | | 2,983.00 | 253,803.11Cr |
| 02 Aug | ABC OB Coll Md Sirago | Sir54322 | 505.00 | 253,298.11Cr |
| 03 Aug | Scheduled Payment To Mrs. L. XYZ | Mr. A. XYZ | 4,000.00 | 249,298.11Cr |
| 05 Aug | Magtape Debit Bidtrack Bidtrack Rd050821 1 | | 236.42 | 249,061.69Cr |
| 06 Aug | Internal Debit Order ABC Card 49815036342143500 | | 5,944.21 | 243,117.48Cr |
| 11 Aug | Magtape Credit Payaccsys Cat85355 | | 35,333.33Cr | 278,450.81Cr |
| 14 Aug | ABC App Payment To Competency | M. XYS | 8,500.00 | 269,950.81Cr |
| 16 Aug | Magtape Credit N. XYZ | | 12,000.00Cr | 281,950.81Cr |
| 19 Aug | ABC App Payment to Inv 148436 | | 27,148.30 | 254,802.51Cr |
| 23 Aug | ABC App Prepaid Airtime 27834532507 | | 100.00 | 254,702.51Cr |
| 24 Aug | ABC OB Pmt Salary Pmbmusjid&Isi | | 18,306.60Cr | 273,009.11Cr |
| 24 Aug | ABC OB Pmt Salary Pmbmusjid&Isi | | 11,605.89Cr | 284,615.00Cr |
| 24 Aug | ABC IApp Rtc Pmt To Q5 | #509137 | 99,595.15 | 185,019.85Cr |
| 24 Aug | Magtape Credit ABSA Fedi Salim | | 300,000.00Cr | 485,019.85Cr |
| 25 Aug | Magtape Debit Vw_Fin_Ser87007030331 | | 6,553.58 | 478,466.27Cr |
| | **Closing Balance** | | | **478,466.27Cr** |

FIG.19A

| Date | Descriptio | Amount | Balance | Accrued B | Debits | Credits |
|---|---|---|---|---|---|---|
| 02-Aug | Magtape D | -529 | 259086.3 | | 529 | 0 |
| 02-Aug | Magtape D | -2300.2 | 256786.1 | | 2300.2 | 0 |
| 02-Aug | Magtape D | -2983 | 253803.1 | | 2983 | 0 |
| 02-Aug | ABC OB Co | -505 | 253298.1 | | 505 | 0 |
| 03-Aug | Scheduled | -4000 | 249298.1 | | 4000 | 0 |
| 05-Aug | Magtape D | -236.42 | 249061.7 | | 236.42 | 0 |
| 06-Aug | Internal De | -5944.21 | 243117.5 | | 5944.21 | 0 |
| 11-Aug | Magtape C | 35333.33 | 278450.8 | | 0 | 35333.33 |
| 14-Aug | ABC App P | -8500 | 269950.8 | | 8500 | 0 |
| 16-Aug | Magtape C | 12000 | 281950.8 | | 0 | 12000 |
| 19-Aug | ABC App P | -27148.3 | 254802.5 | | 27148.3 | 0 |
| 23-Aug | ABC App P | -100 | 254702.5 | | 100 | 0 |

1950 1952 1954 1956

| identifier | home_loan | loan_sum | atm_cnt | atm_sum | dbr | salary_sum | Credit_card | credit_sum | debit_sum |
|---|---|---|---|---|---|---|---|---|---|
| 1 | 0 | 0 | 0 | 0 | 0 | 29912.49 | 0 | 118444.4 | 16153.68 |
| 2 | 0 | 3166.667 | 14 | 10850 | 0.047017 | 67351.9 | 0 | 113964.1 | 7048.403 |
| 3 | 863192.9 | 169646.9 | 5 | 704.6254 | 0.185977 | 45035.56 | 23062.14 | 51023.48 | 54829.67 |
| 4 | 1454633 | 446015.4 | 17 | 5149.166 | 0.608803 | 38103.51 | 22663.27 | 46573.69 | 23952.54 |
| 5 | 50223.03 | 378336.8 | 4 | 13033.68 | 0.594261 | 100659.7 | 29347.6 | 3475.991 | 19852.27 |
| 6 | 639548.5 | 383689.7 | 16 | 5715.659 | 1.311874 | 156891.1 | 2499.293 | 11721.58 | 34815.38 |
| 7 | 336174 | 240044.7 | 3 | 194.1519 | 1.34418 | 61690.75 | 6605.501 | 62170.35 | 15260.18 |
| 8 | 230060.3 | 113274.6 | 19 | 11509.04 | 1.448273 | 165643.9 | 29511.33 | 53837.1 | 48809.4 |
| 9 | 413207.4 | 30322.79 | 19 | 6155.846 | 0.559479 | 65433.39 | 16391.23 | 13446.52 | 53032.87 |
| 10 | 723843.4 | 167696.1 | 4 | 3030.281 | 1.070648 | 35084.22 | 16610.11 | 5495.765 | 50147.51 |
| 11 | 823696.6 | 28185.21 | 19 | 19425.67 | 0.986293 | 112340.1 | 10463.13 | 12228.49 | 21398.62 |
| 12 | 1100693 | 349989.2 | 16 | 3299.445 | 0.439421 | 20176.01 | 21113.59 | 58780.99 | 9189.61 |
| 13 | 867429.3 | 338471.5 | 3 | 14544.71 | 1.317983 | 147460.3 | 14992.91 | 68144.35 | 36486.04 |
| 14 | 1386178 | 220931.2 | 16 | 17814.48 | 0.399743 | 153030.7 | 14084.8 | 53102.24 | 59780.05 |
| 15 | 448681.9 | 386216.6 | 16 | 17174.3 | 1.1468 | 195197.5 | 16493.19 | 55137.72 | 48318.45 |

| credit_cnt | debit_cnt | luxury_sun | luxury_cnt | travel_cnt | travel_sun | num_txn | avg_txn | high_risk_s |
|---|---|---|---|---|---|---|---|---|
| 4 | 18 | 3920.333 | 2 | 0 | 0 | 111 | 1091.808 | 0 |
| 13 | 17 | 5093.333 | 1 | 0 | 0 | 111 | 17.45595 | 0 |
| 18 | 7 | 41127.75 | 4 | 3 | 38595.98 | 75 | 532.3622 | 9897.111 |
| 2 | 32 | 47917.21 | 3 | 1 | 17655.09 | 37 | 2031.737 | 3899.298 |
| 39 | 30 | 26824.57 | 7 | 4 | 32874.4 | 43 | 287.4954 | 7473.506 |
| 27 | 39 | 18082.4 | 6 | 4 | 36923.36 | 45 | 3940.424 | 852.0763 |
| 4 | 12 | 39824.96 | 0 | 3 | 11182.52 | 74 | 1186.825 | 4154.196 |
| 46 | 16 | 47701.9 | 7 | 9 | 1418.147 | 15 | 1597.566 | 7010.957 |
| 40 | 33 | 24697.59 | 4 | 3 | 18370.13 | 10 | 3478.604 | 1410.294 |
| 13 | 16 | 10768.02 | 3 | 1 | 32653.82 | 52 | 2715.302 | 2384.085 |
| 9 | 20 | 28981.6 | 7 | 1 | 21577.64 | 33 | 2650.412 | 7794.946 |
| 22 | 28 | 6966.896 | 8 | 6 | 7750.617 | 35 | 887.2278 | 970.4615 |
| 40 | 18 | 39818.91 | 3 | 6 | 32962.05 | 70 | 4175.589 | 4698.29 |
| 49 | 21 | 33719.73 | 7 | 4 | 11348.1 | 42 | 3020.637 | 570.7964 |
| 35 | 48 | 39154.51 | 7 | 4 | 38450.5 | 4 | 2791.692 | 2405.326 |

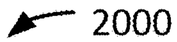

| S.No. 2001 | Variable Name 2002 | Variable Description 2003 |
|---|---|---|
| 1 | ID | Unique ID |
| 2 | home_loan_sum | Amount of home loan |
| 3 | loan_sum | Amount of total loan |
| 4 | atm_cnt | Number of atm transactions |
| 5 | atm_sum | Amount withdrawn from ATM |
| 6 | Dbr | DBR ratio |
| 7 | salary_sum | Monthly Salary |
| 8 | credit_card_payment_sum | Credit Card Payment Made |
| 9 | credit_sum | Amount credited |
| 10 | debit_sum | Amount Debited |
| 11 | credit_cnt | Number of credit transactions |
| 12 | debit_cnt | Number of debit transactions |
| 13 | luxury_sum | Amount spent on luxury goods |
| 14 | luxury_cnt | Number of transactions on luxury goods |
| 15 | travel_cnt | Number of transactions on travel |
| 16 | travel_sum | Amount spent on travel |
| 17 | num_txn | Number of total transactions |
| 18 | avg_txn | Average transaction Value |
| 19 | high_risk_sum | Amount spent on high risk merchants |
| 20 | high_risk_cnt | Number of transactions on high risk merchants |
| 21 | essential_sum | Amount spent on high essential items |
| 22 | essential_cnt | Number of transactions on essential items |
| 23 | healthcare_sum | Amount spent on healthcare |
| 24 | healthcare_cnt | Number of transactions on healthcare |
| 25 | online_sum | Amount spent on online transactions |
| 26 | online_cnt | Number of online transactions |
| 27 | int_txn_sum | Amount spent on international transactions |
| 28 | int_txn_cnt | Number of international transactions |
| 29 | target1 | 90 DPD in 12 months |
| 30 | target2 | 60 DPD in 12 months |
| 31 | target3 | 30 DPD in 12 months |

| Variable 2051 | Variable Name 2052 | Coefficient 2053 |
|---|---|---|
| V1 | age | 0.89804765 |
| V2 | salary | 0.603547 |
| V3 | dbr – calculated | 1.108449 |
| V4 | own_car_flag | 0.316812 |
| V5 | self_employed_flag | 0.627295 |
| V6 | years_of_experience | 1.011434 |
| V7 | amount of loan | 0.50690585 |
| V8 | atm amount withdrawn | 1.107635 |
| V9 | dbr - actual | 0.710665 |
| V10 | total credited amount | 0.761427 |

AUC (Development sample) = 0.89

AUC (Validation sample) = 0.90

| S.No. 2131 | Variable Name 2132 | Variable Description 2133 |
|---|---|---|
| 1 | acc_num | Account Number |
| 2 | name | Name |
| 3 | owner_name | Premise Owner Name |
| 4 | address | Address |
| 5 | invoice | Invoice id |
| 6 | period | Period of bill generation |
| 7 | kwh | KWH electricity usage |
| 8 | water_ig | Water usage in gallon |
| 9 | prev_bill | Previous month bill amount |
| 10 | prev_payment | Previous month bill payment |
| 11 | elec_bill | Electricity usage bill |
| 12 | water_bill | Water usage bill |
| 13 | tot1_bill | Electricity + Water usage bill |
| 14 | hous_bill | Housing Bill |
| 15 | sew_bill | Sewerage bill |
| 16 | tot2_bill | Housing+Sewerage Bill |
| 17 | tot_bill | Total bill |
| 18 | ratio_prev | Ratio of current month bill to previous month bill |
| 19 | tot_bill_due | Total bill amount due |
| 20 | paid_all | Was the previous month bill amount paid in full |
| 21 | kwh_cat | Electrcity usage category |
| 22 | kgco2 | CO2 emission |
| 23 | kgco2_cat | CO2 emmision category |
| 24 | water_ig_cat | Water usage category |
| 25 | target1 | 90 DPD in 12 months |
| 26 | target2 | 60 DPD in 12 months |
| 27 | target3 | 30 DPD in 12 months |

| Variable 2161 | Variable Name 2162 | Coefficient 2163 |
|---|---|---|
| V1 | age | 0.89451839 |
| V2 | salary | 0.672042 |
| V3 | dbr – calculated | 0.895459 |
| V4 | own_car_flag | 0.239373 |
| V5 | self_employed_flag | 0.767466 |
| V6 | years_of_experience | 1.41389 |
| V7 | amount of loan | 1.105015 |
| V8 | atm amount withdrawn | 0.876598 |
| V9 | dbr – actual | 0.601232 |
| V10 | total credited amount | 1.078939 |
| V11 | water usage in gallon | 0.62164 |
| V12 | total utility bill amount | 0.742788 |
| V13 | ratio of current utility bill amount to previous bill amount | 0.695607 |

AUC (Development sample) = 0.93

AUC (Validation sample) = 0.91

Account Number 111-1111111 Bill period 01 Jul 2024 - 31 Jul 2024

TAX INVOICE and TAX CREDIT NOTE 696.39 AED incl. 5% VAT

PAY BEFORE 15 AUG 2024

PAY ONLINE
www.etisalat.ae/businessquickpay

Business Mobile Postpaid

| BILLING CHARGES | AED |
|---|---|
| • Service Rentals | 310.00 |
| • Usage Charges | 0.30 |
| • One-Time Charges | 0.00 |
| • Other Credits & Charges | 0.00 |
| • VAT on taxable services - Current Period | 15.52 |
| Current month charges (including VAT) | 325.82 |
| Tax Point Date: 31 Jul 2024 | |
| • Previous month bill | 370.57 |
| • Refunds & Adjustments | 0.00 |
| • Vat Credits - Previous periods | 0.00 |
| • Vat Debits - Previous periods | 0.00 |
| • Payments received | 0.00 |
| Balance Carried Forward | 370.57 |
| **Total Amount Due** | **696.39** |

*FIG. 22A*

| S.No. 2221 | Variable Name 2222 | Variable Description 2223 |
|---|---|---|
| 1 | business_cus_num | Business customer number |
| 2 | cus_trn | Customer TRN number |
| 3 | acc_num | Account number |
| 4 | bill_num | Bill number |
| 5 | bill_issue_date | Bill issue date |
| 6 | bill_period | Bill for period |
| 7 | serv_rental | Service rental amount |
| 8 | usage_charges | Usage charges |
| 9 | vat_charges | VAT charges |
| 10 | curr_month_charges | Current month bill |
| 11 | prev_month_charges | Previous month bill |
| 12 | payment_recvd | Payment received for previous month |
| 13 | tot_charges | Total Charges for this month bill |
| 14 | ratio_curr_prev | Ratio of this month charges to previous month charges |
| 15 | paid_all | Was the previous month bill amount paid in full |
| 16 | target1 | 90 DPD in 12 months |
| 17 | target2 | 60 DPD in 12 months |
| 18 | target3 | 30 DPD in 12 months |

2220 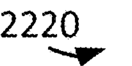

*FIG. 22B*

| Variable 2241 | Variable Name 2242 | Coefficient 2243 |
|---|---|---|
| V1 | age | 1.00112068 |
| V2 | salary | 0.519133 |
| V3 | dbr – calculated | 0.899165 |
| V4 | self_employed_flag | 0.858727 |
| V5 | years_of_experience | 1.430642 |
| V6 | amount of loan | 1.093453 |
| V7 | atm amount withdrawn | 1.092536 |
| V8 | dbr – actual | 0.636237 |
| V9 | total credited amount | 1.179587 |
| V10 | water usage in gallon | 0.529318 |
| V11 | total utility bill amount | 0.642581 |
| V12 | ratio of current utility bill amount to previous bill amount | 0.81059 |
| V13 | Service rental amount | 0.796551 |
| V14 | Usage charges | 0.694903 |
| V15 | VAT charges | 0.535418 |
| V16 | Current month bill | 0.15692 |
| V17 | Previous month bill | 0.950804 |
| V18 | Payment received for previous month | 0.520266 |
| V19 | Total Charges for this month bill | 0.462304 |
| V20 | Ratio of this month charges to previous month charges | 0.055069 |

AUC (Development sample) = 0.96

AUC (Validation sample) = 0.97

Sustainability Report 2023

| Environment | | DX 2021 | DX 2022 | DS 2021 | DS 2022 | Total 2021 | Total 2022 |
|---|---|---|---|---|---|---|---|
| GHG emissions from business sites[3] | 1,000 tonnes $CO_2e$ | 1,790 | 366 | 15,610 | 14,687 | 17,400 | 15,053 |
| Direct emissions | 1,000 tonnes $CO_2e$ | 263 | 254 | 7,341 | 5,718 | 7,604 | 5,972 |
| Indirect emissions | 1,000 tonnes $CO_2e$ | 1,527 | 112 | 8,269 | 8,969 | 9,796 | 9,081 |
| Other indirect emissions | 1,000 tonnes $CO_2e$ | | 109,951 | | 14,764 | | 124,715 |
| Energy consumption at business sites | GWh | 4,396 | 4,327 | 27,926 | 30,850 | 32,322 | 35,177 |
| Electricity | GWh | 3,143 | 3,067 | 22,624 | 25,249 | 25,767 | 28,316 |
| Others | GWh | 1,253 | 1,260 | 5,302 | 5,601 | 6,555 | 6,861 |
| Renewable energy consumption | GWh | 556 | 2,856 | 4,722 | 5,849 | 5,278 | 8,704 |
| Transition to renewable energy | % | 18 | 93 | 21 | 23 | 20 | 31 |
| Waste generated | Tonnes | 348,427 | 329,861 | 976,545 | 1,083,504 | 1,324,972 | 1,413,365 |
| General waste | Tonnes | 290,851 | 274,126 | 612,902 | 657,803 | 903,753 | 931,929 |
| Hazardous waste[3] | Tonnes | 57,576 | 55,735 | 363,643 | 425,701 | 421,219 | 481,436 |
| Water intake | 1,000 tonnes | 19,392 | 18,822 | 144,269 | 153,988 | 163,660 | 172,811 |
| Municipal water (surface water) | 1,000 tonnes | 18,833 | 18,124 | 144,269 | 153,988 | 163,102 | 172,113 |
| Underground water[3] | 1,000 tonnes | 558 | 698 | 0 | 0 | 558 | 698 |
| Chemicals consumption at business sites[4] | 1,000 tonnes | 8 | 6 | 512 | 572 | 520 | 578 |

FIG. 23A

| Environment | Units | DX | | DS | | Total | |
|---|---|---|---|---|---|---|---|
| | | 2021 | 2022 | 2021 | 2022 | 2021 | 2022 |
| GHG emissions from l | 1,000 tonnes CO2e | 1,790 | 366 | 15,610 | 14,687 | 17,400 | 15,053 |
| Direct emissions | 1,000 tonnes CO2e | 263 | 254 | 7,341 | 5,718 | 7,604 | 5,972 |
| Indirect emissions | 1,000 tonnes CO2e | 1,527 | 112 | 8,269 | 8,969 | 9,796 | 9,081 |
| Other indirect emissic | 1,000 tonnes CO2e | | 109,951 | | 14,764 | | 124,715 |
| Energy consumption at business sites | GWh | 4,396 | 4,327 | 27,926 | 30,850 | 32,322 | 35,177 |
| Electricity | GWh | 3,143 | 3,067 | 22,624 | 25,249 | 25,767 | 28,316 |
| Others | GWh | 1,253 | 1,260 | 5,302 | 5,601 | 6,555 | 6,861 |
| Renewable energy consumption | GWh | 556 | 2,856 | 4,722 | 5,849 | 5,278 | 8,704 |

| Energy consumption in megawatt-hours. 2261 | Water usage in megaliters. 2262 | Greenhouse gas emissions in tons of CO2. 2263 | Waste generated in tons. 2264 | Employee satisfaction %. 2265 | Community investments in thousands of dollars. 2266 | Diversity index score. 2267 | Governance rating. 2268 | Supplier sustainability %. 2270 | Innovation index score. 2271 |
|---|---|---|---|---|---|---|---|---|---|
| 202 | 38.05 | 279.84 | 32.95 | 92 | 317 | 0.98 | 5.47 | 59 | 0.84 |
| 535 | 56.81 | 237.83 | 11.99 | 67 | 372 | 0.79 | 7.09 | 66 | 0.75 |
| 960 | 59.2 | 149.95 | 35.9 | 64 | 114 | 0.82 | 3.54 | 69 | 0.03 |
| 370 | 26.64 | 103.94 | 12.63 | 98 | 466 | 0.72 | 9.82 | 73 | 0.87 |
| 206 | 97.26 | 201.93 | 16.94 | 63 | 217 | 0.65 | 9.9 | 54 | 0.35 |
| 171 | 79.76 | 474.31 | 37.58 | 65 | 379 | 0.66 | 7.89 | 83 | 0.4 |
| 800 | 94.55 | 195.44 | 32.83 | 91 | 92 | 0.84 | 6.75 | 55 | 0.1 |
| 120 | 90.53 | 283.46 | 42.61 | 89 | 93 | 0.88 | 5.17 | 51 | 0.74 |
| 714 | 63.81 | 366.36 | 33.22 | 94 | 334 | 0.9 | 8.7 | 62 | 0.18 |
| 221 | 92.97 | 213.63 | 28.85 | 99 | 446 | 0.89 | 7.79 | 92 | 0.56 |
| 566 | 17.96 | 487.3 | 5.59 | 75 | 61 | 0.55 | 4.14 | 92 | 0.84 |
| 314 | 27.64 | 483.1 | 19.02 | 72 | 144 | 0.75 | 9.38 | 97 | 0.09 |
| 430 | 14.07 | 163.3 | 13.99 | 89 | 351 | 0.53 | 8.76 | 60 | 0.54 |
| 558 | 39.28 | 273.76 | 12.96 | 78 | 435 | 0.77 | 9.65 | 96 | 0.23 |

| S.No. | Variable Name | Variable Description |
|---|---|---|
| 1 | EnergyMWh | Energy consumption in megawatt-hours. |
| 2 | WaterML | Water usage in megaliters. |
| 3 | GHGCO2 | Greenhouse gas emissions in tons of CO2. |
| 4 | WasteTons | Waste generated in tons. |
| 5 | EmpSatPct | Employee satisfaction percentage. |
| 6 | CommInvestK | Community investments in thousands of dollars. |
| 7 | DivIndex | Diversity index score. |
| 8 | GovScore | Governance rating. |
| 9 | SupSustainPct | Supplier sustainability percentage. |
| 10 | InnovIndex | Innovation index score. |
| 11 | Score | ESG Score<br>of the corporate |

| VariableID 2441 | Variable 2442 | Coefficient 2443 |
|---|---|---|
| V1 | NUMPUB | 0.0019643 |
| V2 | NUMDIRECTORMAN | 0.4274576 |
| V3 | WOMENDIRE | 6.408725 |
| V4 | PROFMARGIN | -0.3820655 |
| V5 | NUMCOMP | -0.016921 |
| V6 | EnergyMWh | -0.0099249 |
| V7 | WaterML | -0.102683 |
| V8 | GHGCO2 | 0.0580685 |
| V9 | WasteTons | 0.0955554 |
| V10 | EmpSatPct | -0.1469984 |
| V11_1 | BVDIND_B+ | -2.5276088 |
| V11_2 | BVDIND_C+ | -4.3405807 |
| V11_3 | BVDIND_D | 10.7676166 |
| V11_4 | BVDIND_U | -24.5750546 |

$R^2 = 0.40$

RMSE = 18.91

COMPUTING DEVICES, SYSTEMS, AND GRAPHICAL USER INTERFACES FOR FEATURE GENERATION USING UNSTRUCTURED DATA

CROSS-REFERENCE TO RELATED APPLICATIONS

This application claims the benefit of, and priority based on, 35 U.S.C. § 119 to U.S. Provisional Application No. 63/721,944, filed Nov. 18, 2024, and U.S. Provisional Application No. 63/708,151, filed Oct. 16, 2024, the disclosures of each of which are incorporated herein by reference in their entirety.

BACKGROUND

Scorecard data models can represent computer models designed to predict approval or lending in response to a request. Scorecard data models can facilitate objective decision making which can reduce incidents of defaults and provide fairness in computer processes.

SUMMARY

In an example embodiment, a computer-program product tangibly embodied in a non-transitory machine-readable storage medium is provided. The computer-program product includes instructions to cause a computing system to generate a first feature for a machine learning model by receiving identification of character data. The character data is stored in a database that the computing system is not authorized to access. The database comprises multiple documents comprising the character data. One or more documents of the multiple documents pertain to a respective entity of multiple entities. The character data comprises identifying information that identifies a given entity when disclosed or misused. The computer-program product includes instructions to cause a computing system to generate a first feature for a machine learning model by extracting a subset of the character data. The extracting excludes the identifying information. The computer-program product includes instructions to cause a computing system to generate a first feature for a machine learning model by generating structured data from the subset of the character data by: generating multiple structured data terms; and storing the multiple structured data terms in respective data elements of multiple memory blocks in memory of the computing system. The computer-program product includes instructions to cause a computing system to generate a first feature for a machine learning model by generating the first feature for the machine learning model based on one or more of: at least two structured data terms in different memory blocks of the multiple memory blocks; and data manipulation of a structured data term in a memory block of the multiple memory blocks.

In another example embodiment, a computer-program product tangibly embodied in a non-transitory machine-readable storage medium is provided. The computer-program product includes instructions to cause a computing system to generate a feature for a machine learning model by receiving identification of character data. The character data is stored in a database comprises multiple documents. One or more documents of the multiple documents pertain to a respective entity of multiple entities. The computer-program product includes instructions to cause a computing system to generate a feature for a machine learning model by generating structured data from the character data by: generating multiple structured data terms; and storing the multiple structured data terms in respective data elements of multiple memory blocks in memory of the computing system. The computer-program product includes instructions to cause a computing system to generate a feature for a machine learning model by generating the feature for the machine learning model based on one or more of: at least two structured data terms in different memory blocks of the multiple memory blocks; and data manipulation of a structured data term in a memory block of the multiple memory blocks. The computer-program product includes instructions to cause a computing system to generate, using the feature, a machine learning model for making one or more predictions for the multiple entities. The computer-program product includes instructions to cause a computing system to generate, based on the machine learning model, a scorecard data model for a first entity that is not a member of the multiple entities.

In another example embodiment, a computing system is provided. The computing system includes, but is not limited to, a processor and memory. The memory contains instructions that when executed by the processor control the computing system to generate feature(s), machine learning model(s), scorecard data model(s), and/or scorecard(s).

In another example embodiment, a method of generating feature(s), machine learning model(s), generate scorecard data model(s), and/or scorecard(s) is provided.

Other features and aspects of example embodiments are presented below in the Detailed Description when read in connection with the drawings presented with this application.

BRIEF DESCRIPTION OF THE DRAWINGS

FIGS. 18A-18B illustrate an example model assessment for a model developed based on reported data according to at least one embodiment of the present technology.

FIGS. 19A-19D illustrate extracted data from a private database including bank statements according to at least one embodiment of the present technology.

FIGS. 20A-20B illustrate an example model assessment for extracted data from a private database including bank statements according to at least one embodiment of the present technology.

FIGS. 21A-21C illustrate an example model assessment for extracted data from a private database including bank and utility statements according to at least one embodiment of the present technology.

FIGS. 22A-22D illustrate an example model assessment for extracted data from a private database including bank, utility, and telecommunication statements according to at least one embodiment of the present technology.

FIGS. 23A-23C illustrate extracted data from a public database including sustainability reports according to at least one embodiment of the present technology.

FIGS. 24A-24C illustrate an example model assessment for extracted data from a public database according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
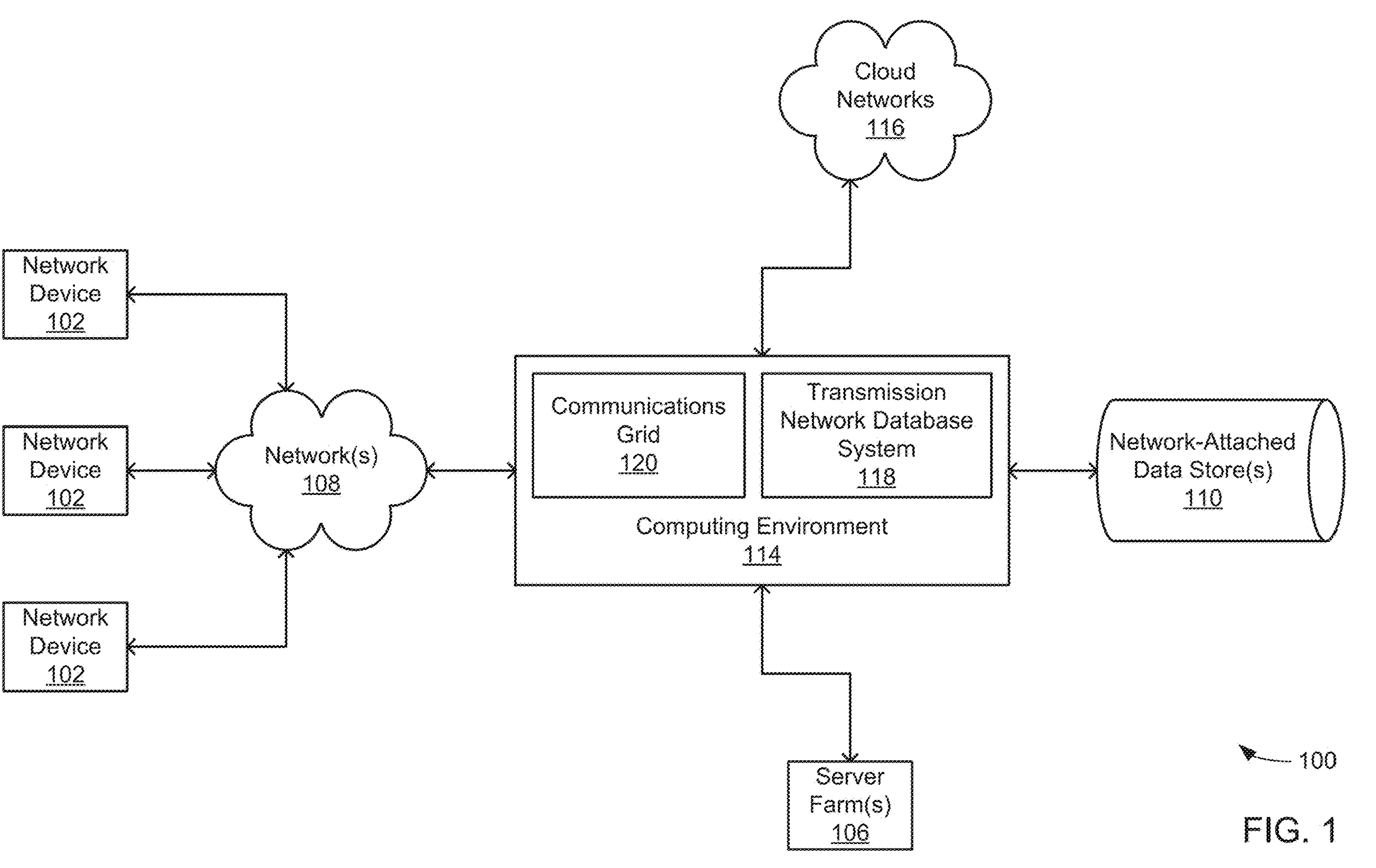
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
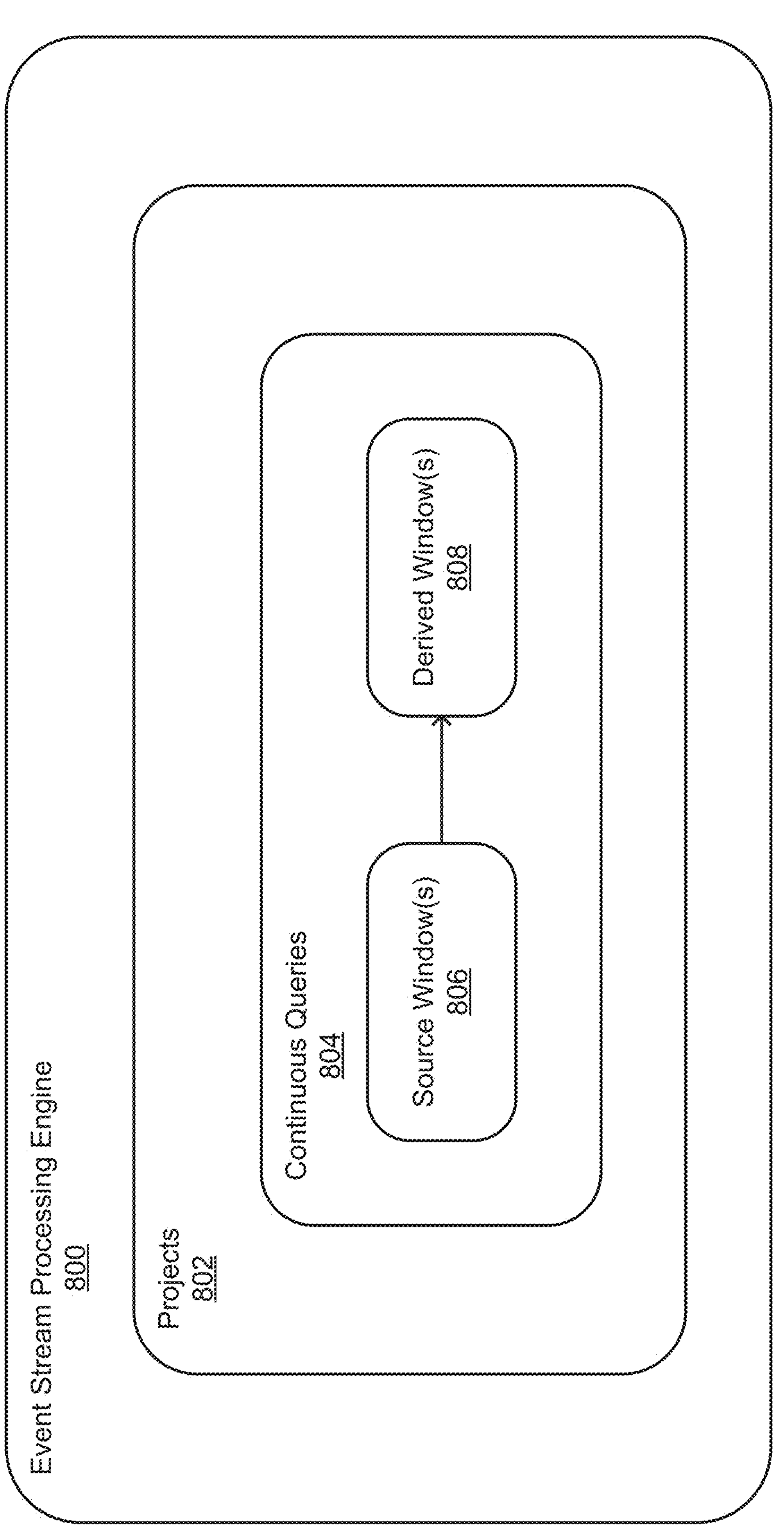
FIG. 8 illustrates a block diagram including components of an Event Stream Processing Engine (ESPE), according to embodiments of the present technology.
Figure 9:
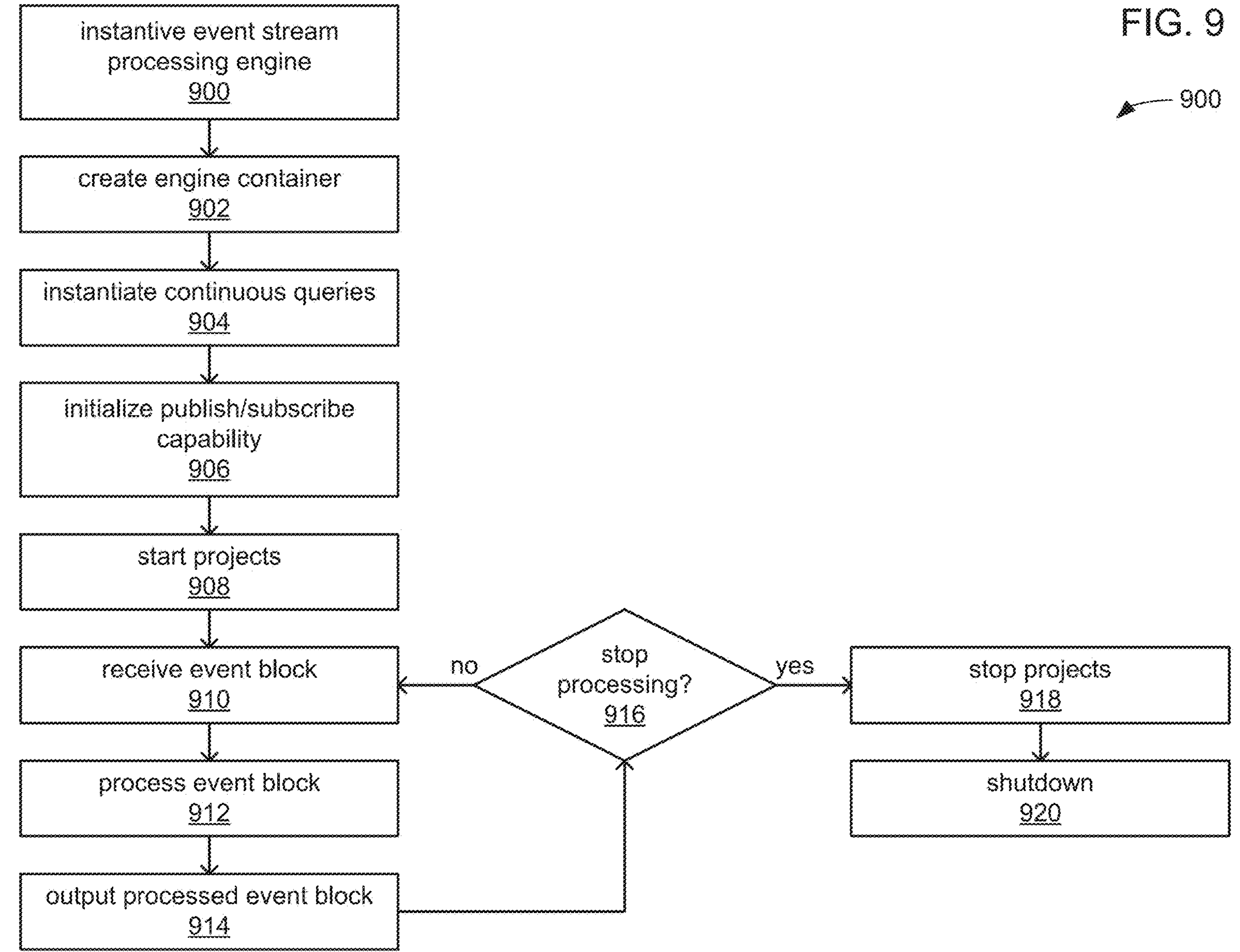
FIG. 9 illustrates a flow chart showing an example process including operations performed by an event stream processing engine, according to some embodiments of the present technology.
Figure 10:
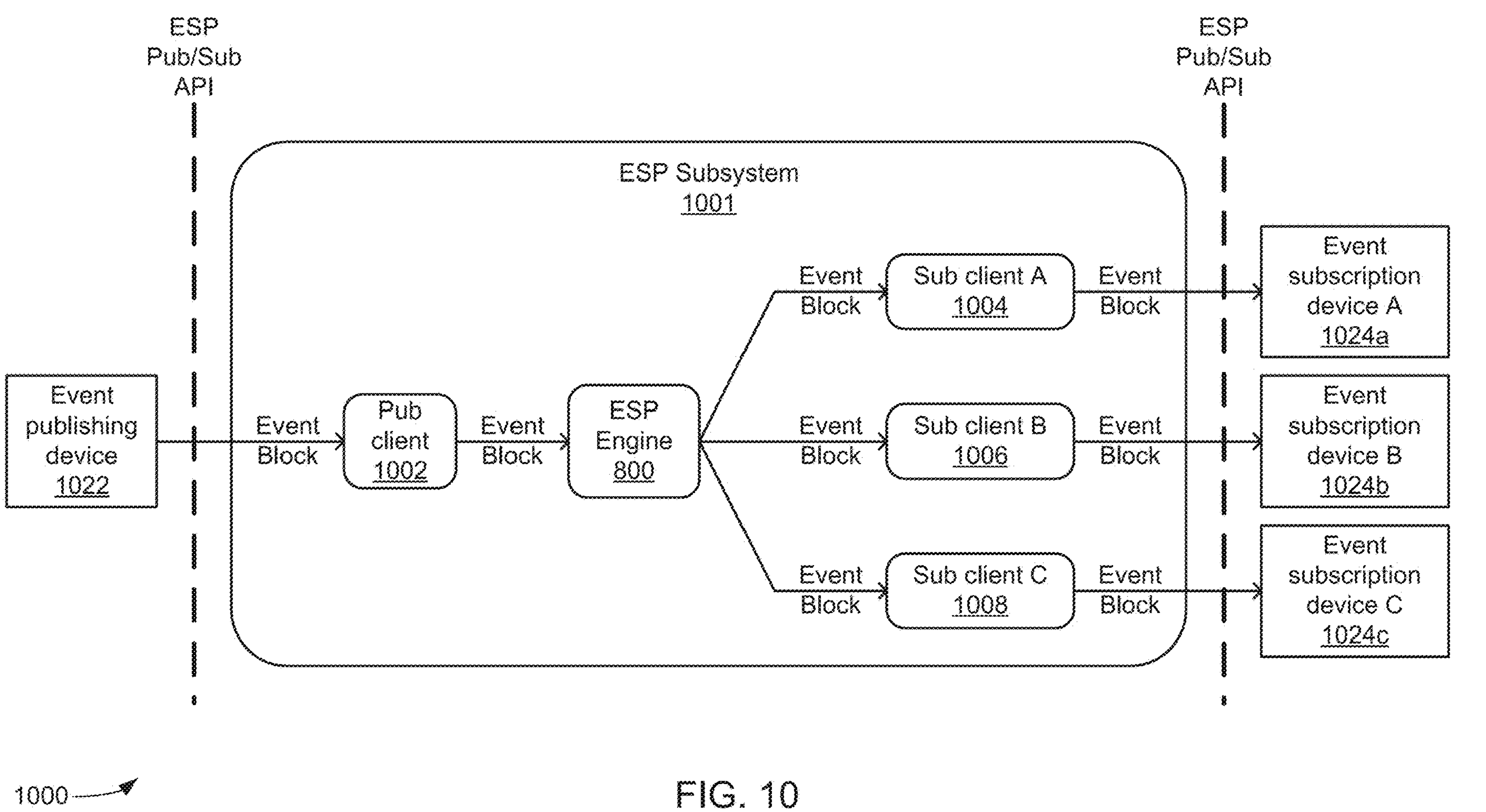
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP or MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
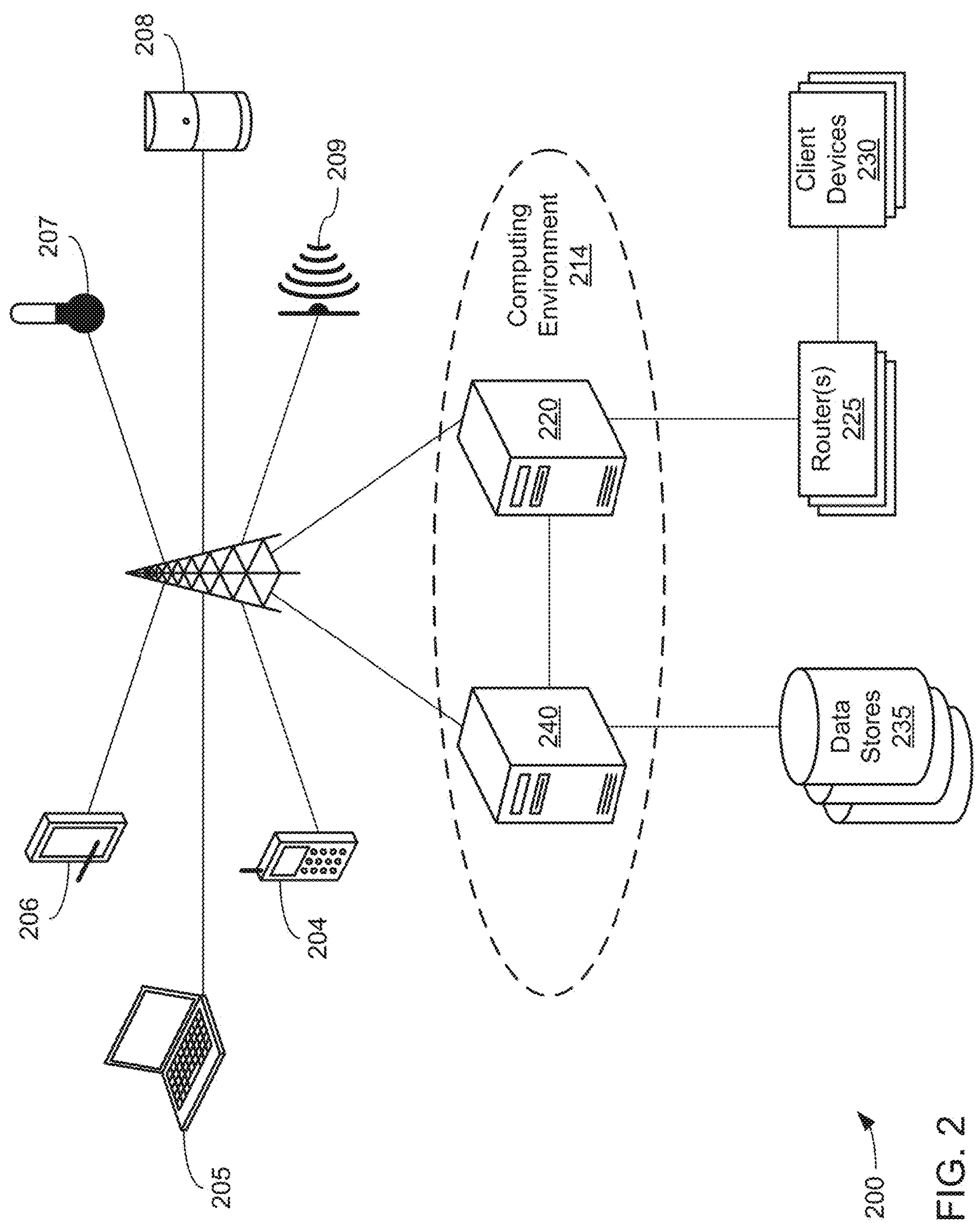
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
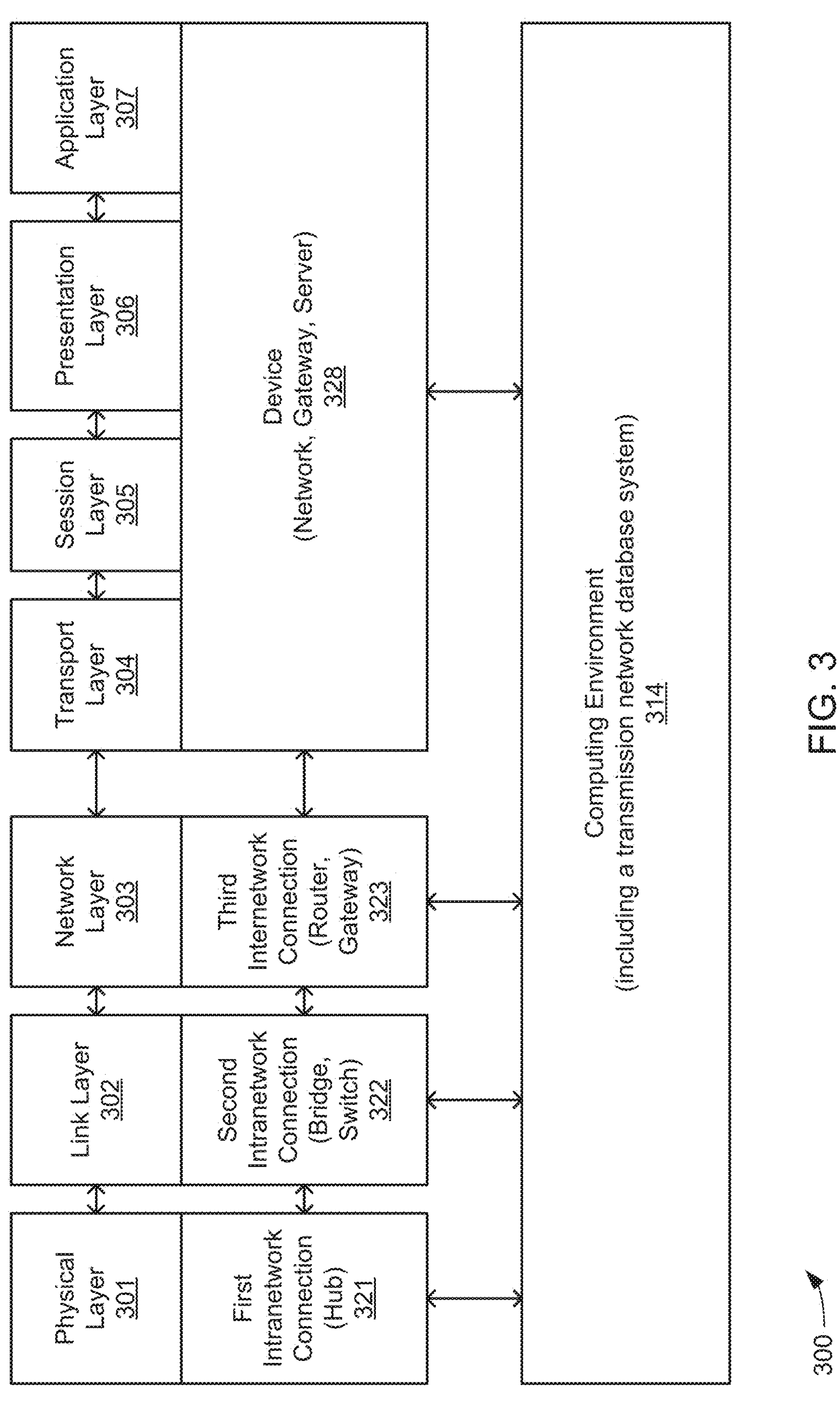
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and the physical layer is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
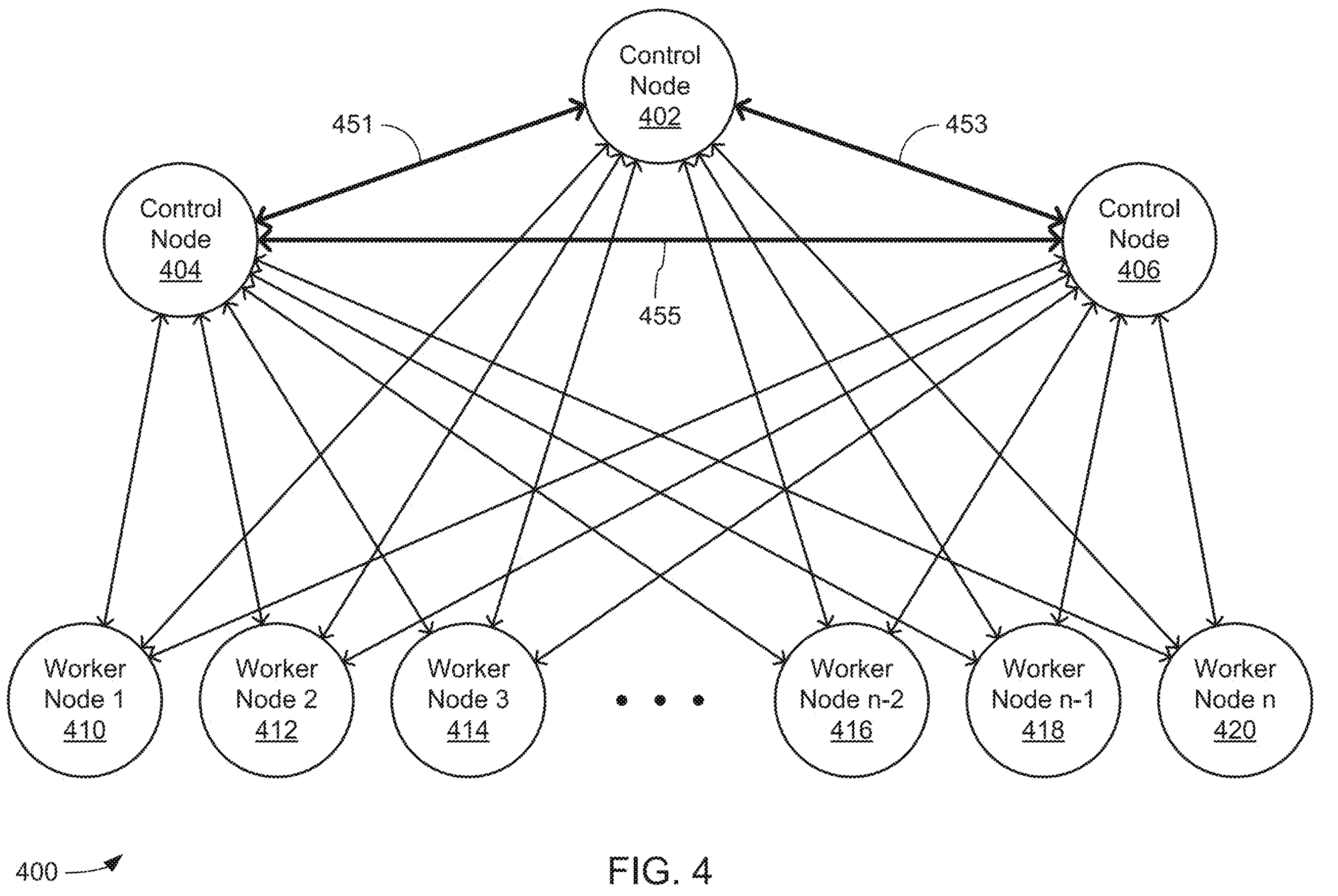
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail, and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection.

If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
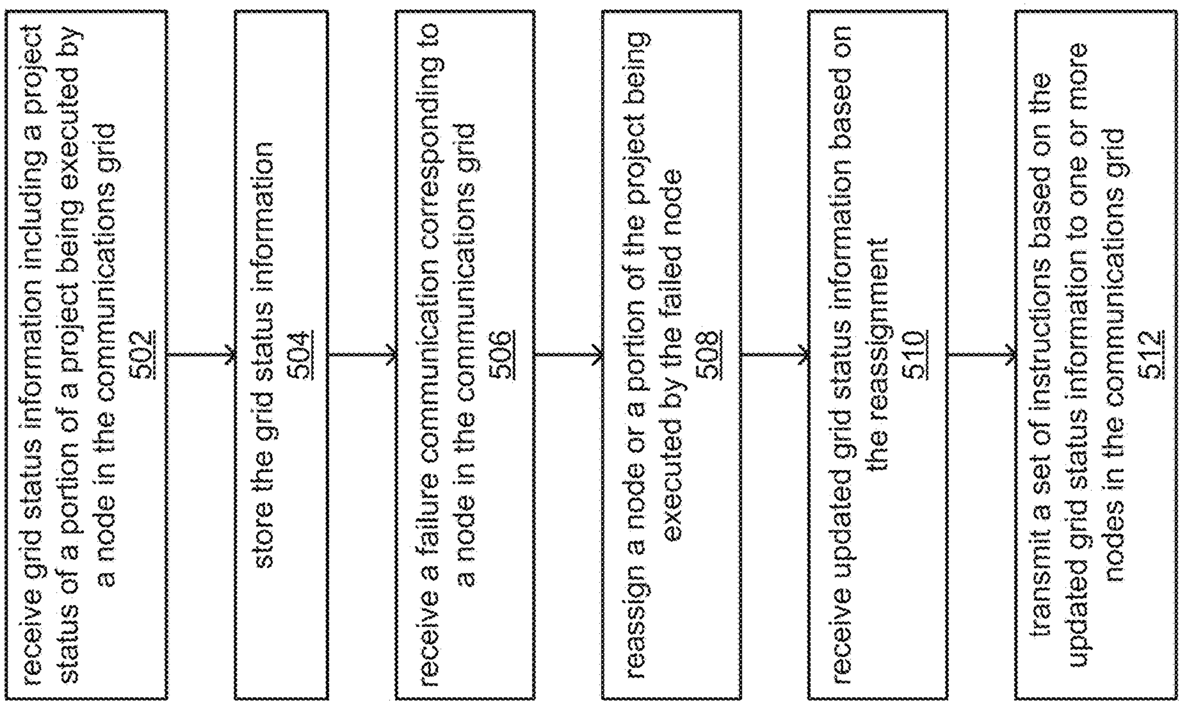
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
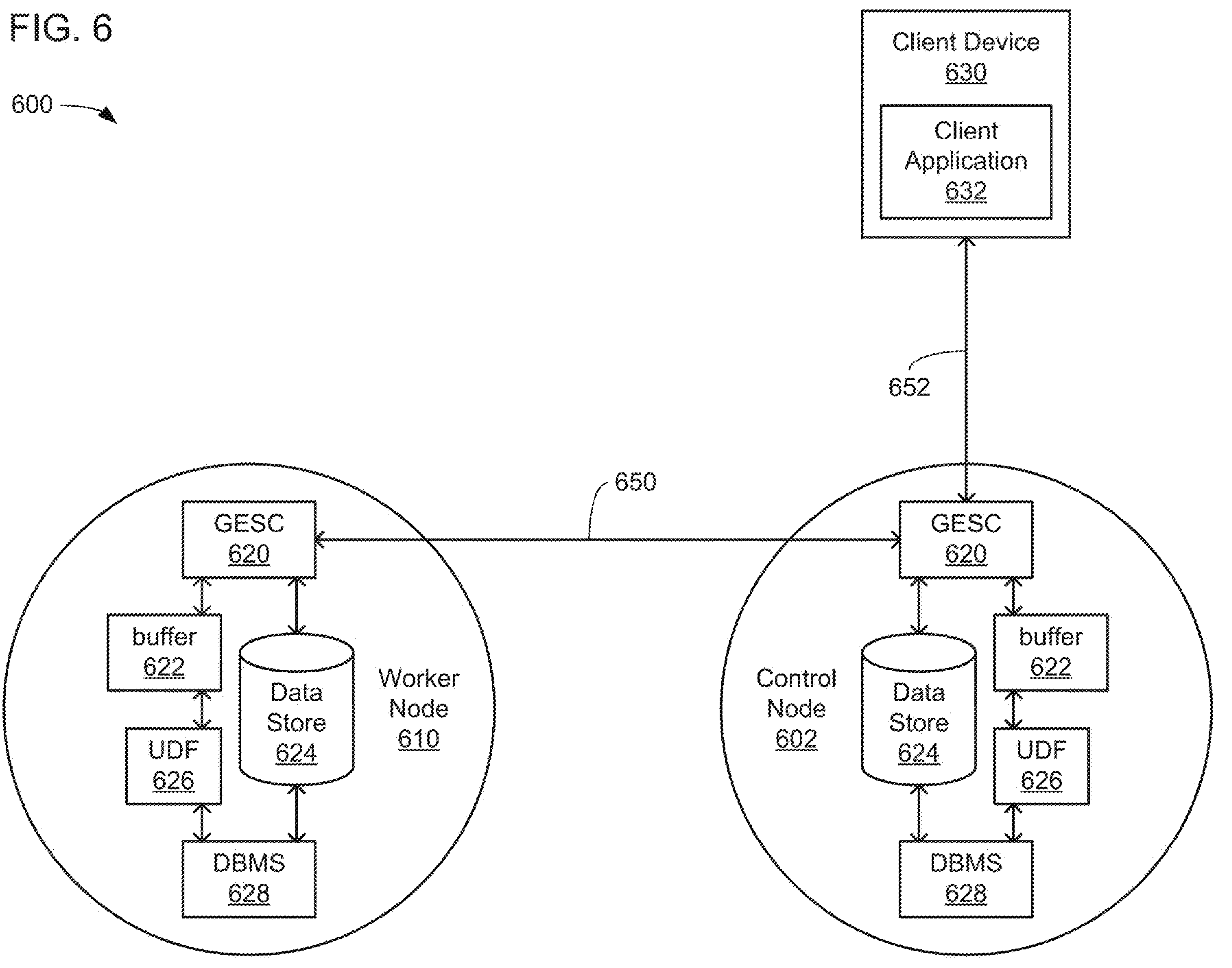
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650.

Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
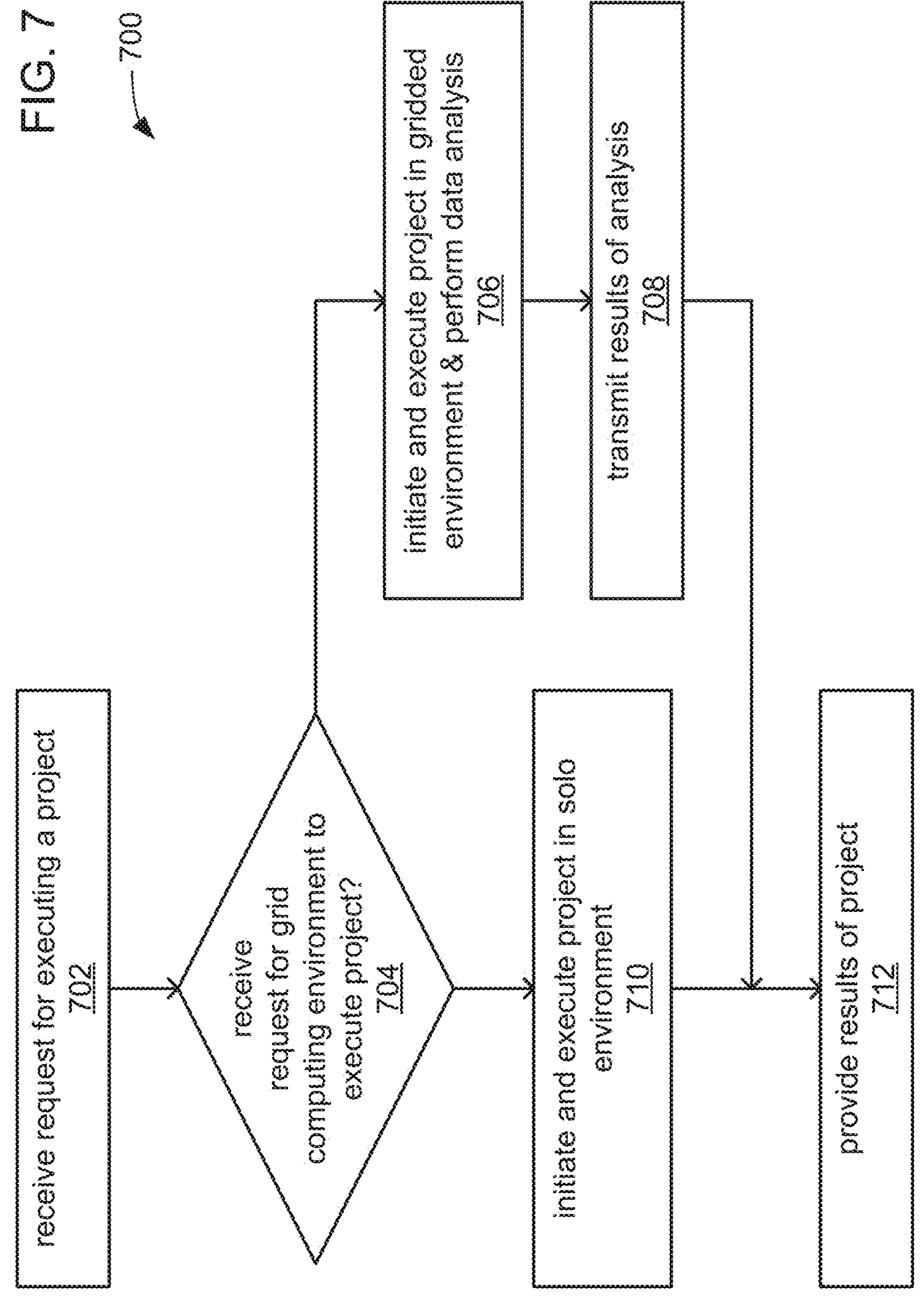
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
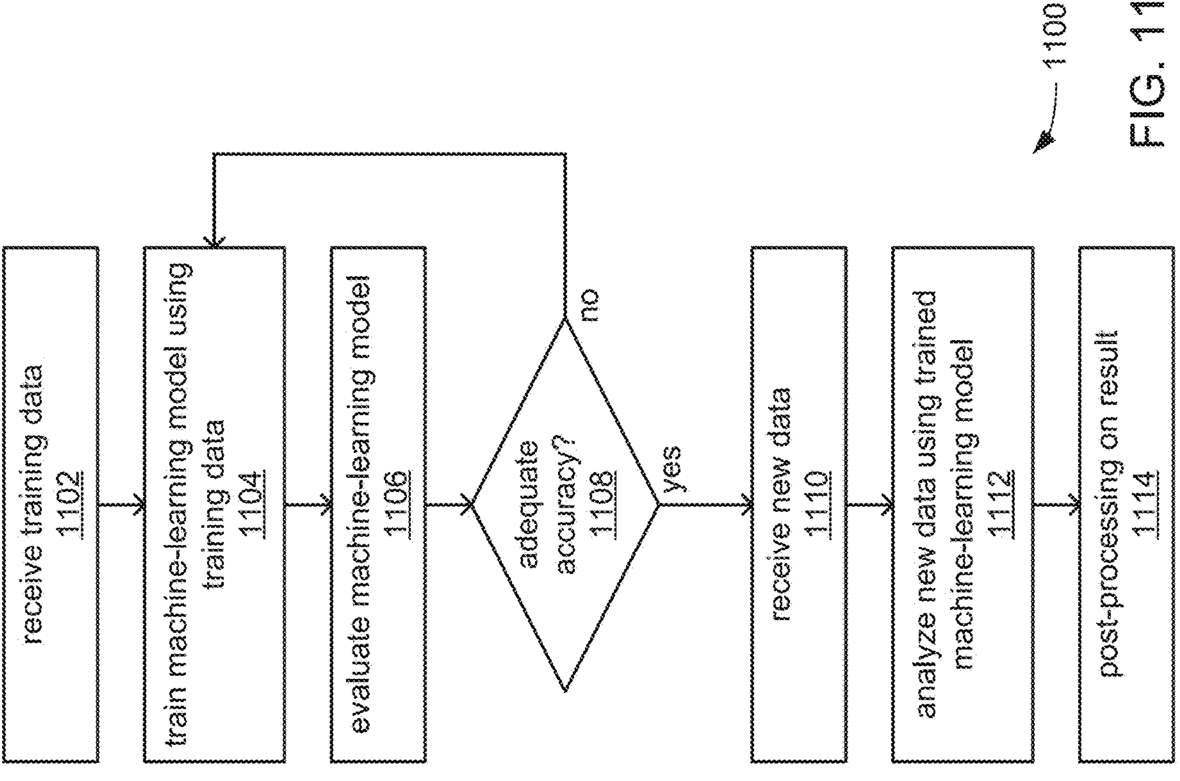
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, transformer networks, large language models (LLMs), agents of LLMs, multi-modal models, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
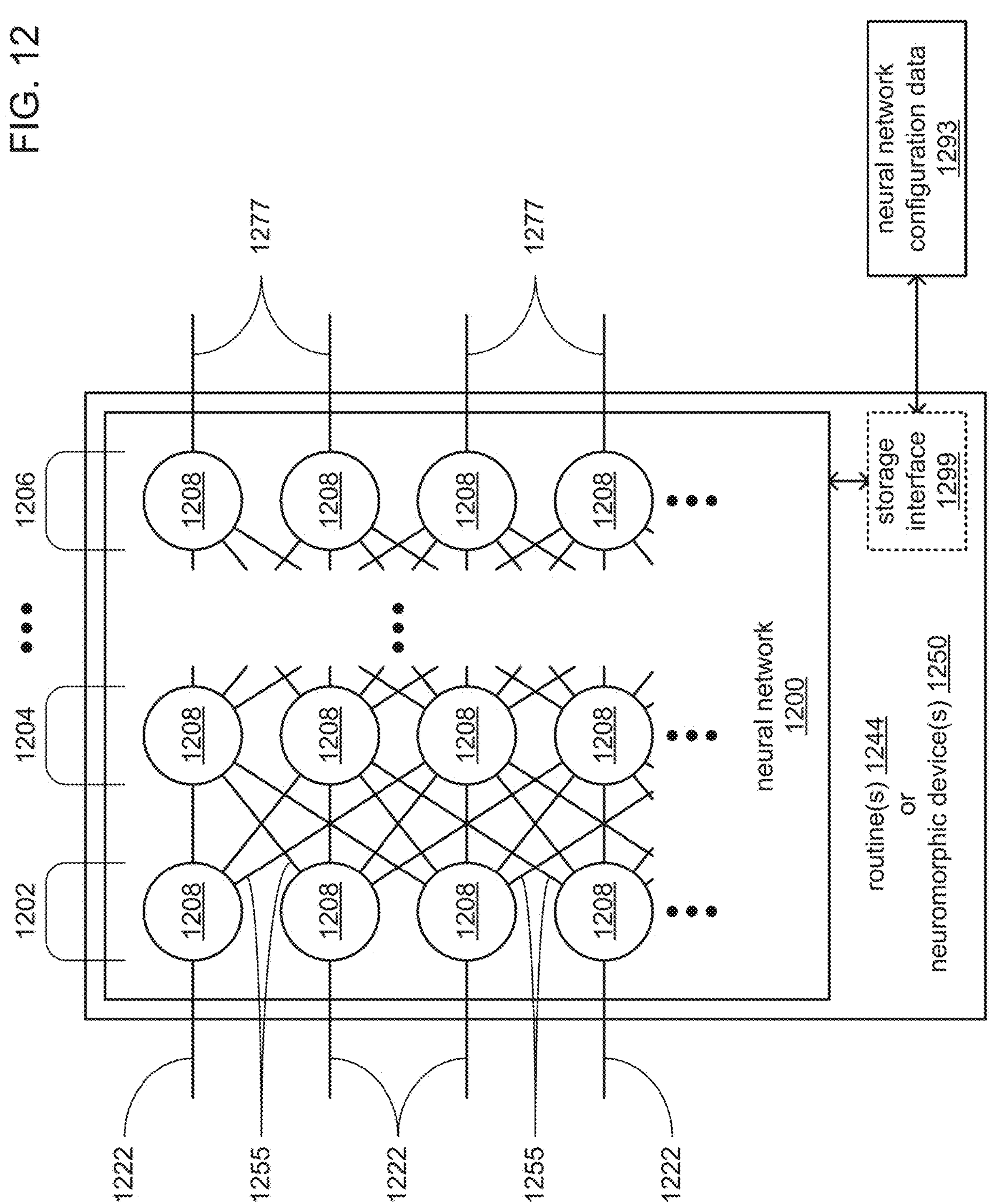
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
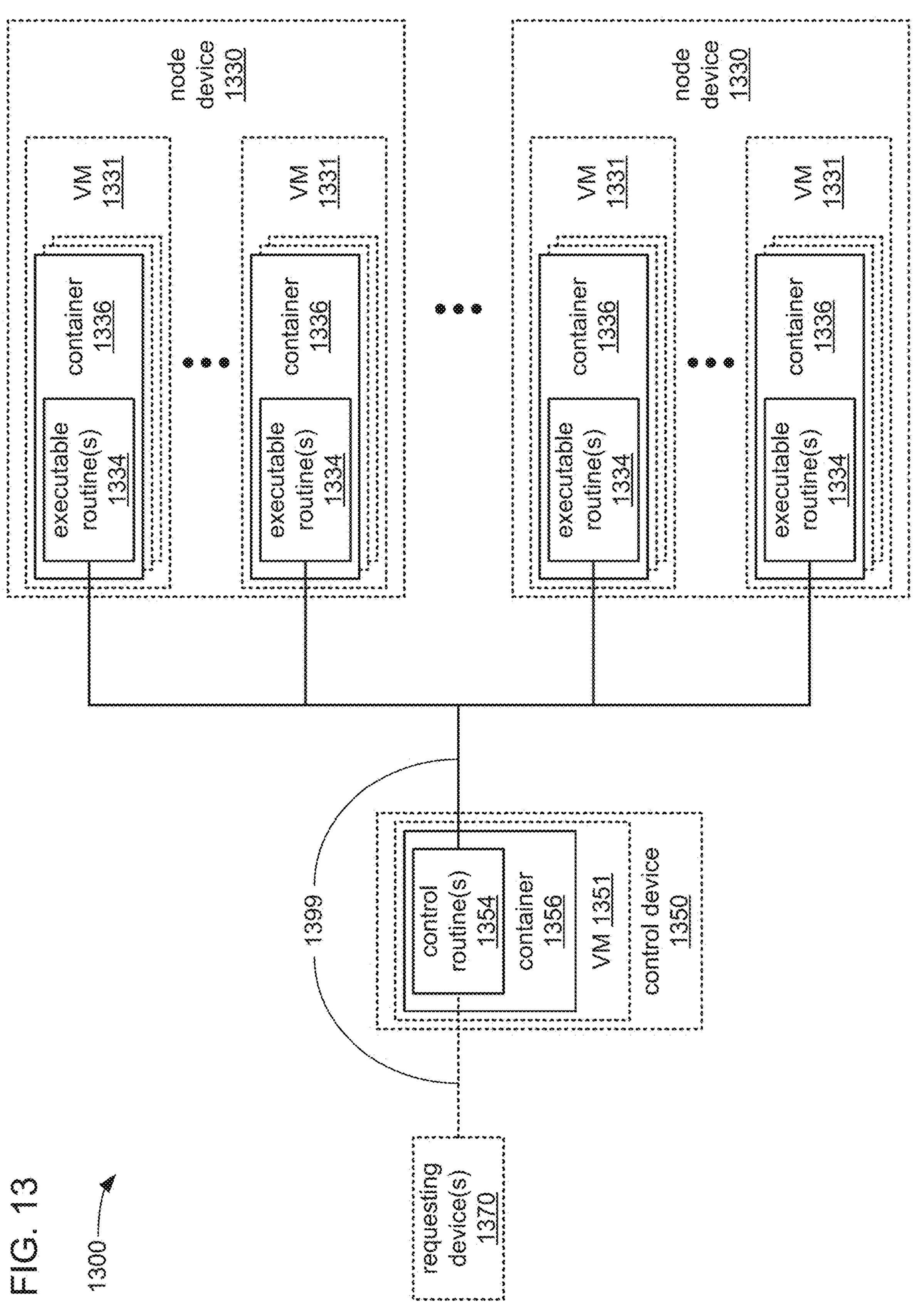
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Embodiments can provide enhanced feature engineering (e.g., features for machine learning models and scorecard data models). For instance, some enhanced features can be generated from unstructured character data (e.g., alphanumeric characters and symbols). Some unstructured character data can have identifying information that identifies individuals or corporate entities associated with the character data. Embodiments can provide data anonymization in those situations. For instance, anonymizing personal identifiers can protect individual identities. Raw data from documents can undergo anonymization processes to strip or mask any personally identifiable information (PII) before it is processed for model training or scoring. Embodiments can also provide granular data minimization. With granular data minimization, only necessary data elements are processed once collected. The computing system applies a selective data processing mechanism that limits the data to specific fields relevant to the scoring model (e.g., transaction categories rather than transaction details), minimizing data exposure. Data anonymization and granular data minimization can help maintain compliance with data privacy regulations like General Data Protection Regulation (GDPR) and California Consumer Privacy Act (CCPA). For instance, the GDPR provides regulations on computer processing of personal data, and CCPA provides consumer protection laws for collection of personal information.

Enhanced features in embodiments can be useful for generating scorecard data models. A variety of industries use scorecard data models for decision making, prediction, and assessment such as Environmental, Social, and Governance (ESG) scorecard data models and business approval scorecard data models. A computing system can apply a scorecard data model to a new entity to generate a scorecard for that particular entity indicating a scoring under the scorecard data model.

Figure 14:
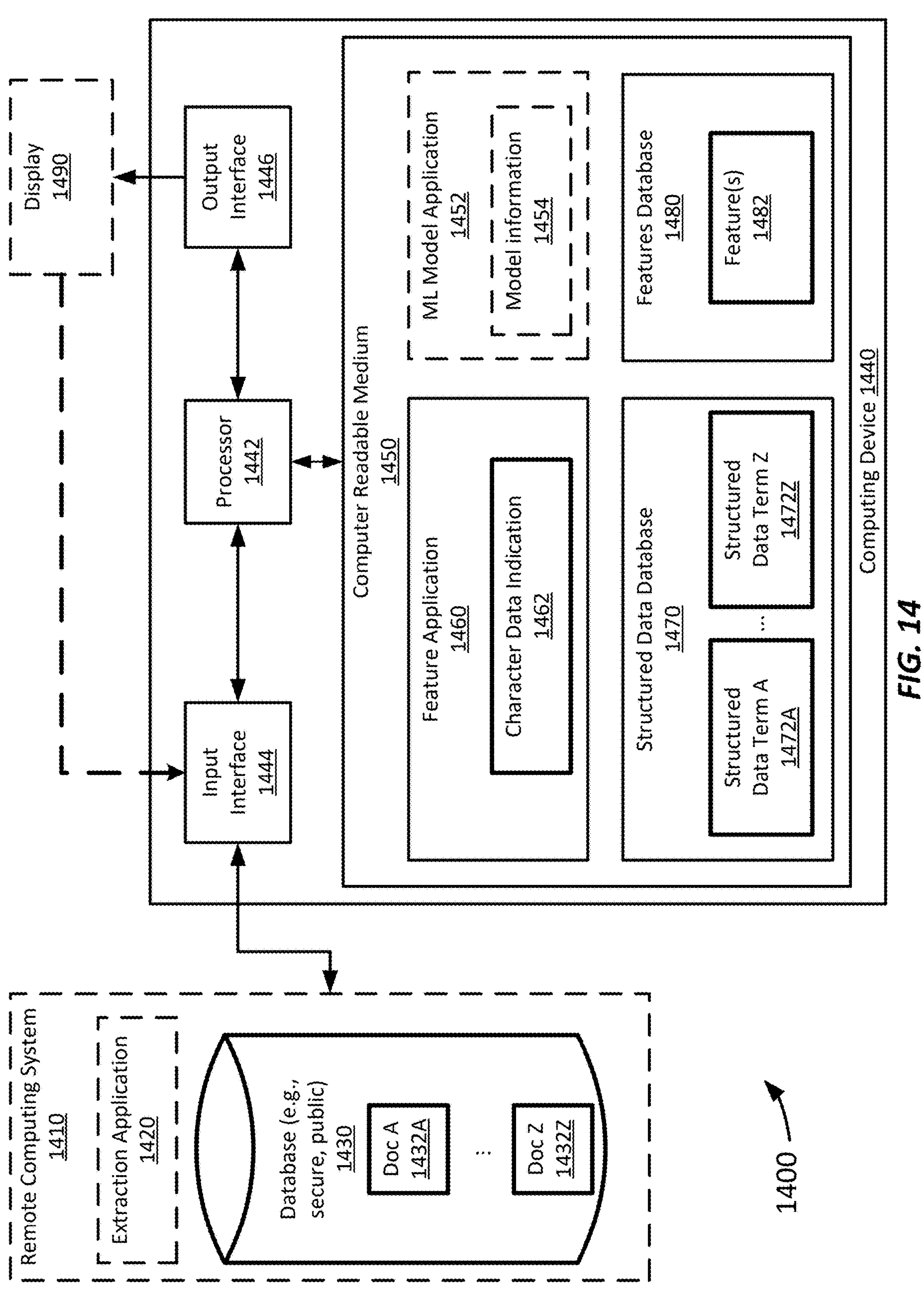
FIG. 14 illustrates a block diagram of a system for generating feature(s) according to at least one embodiment of the present technology.

FIG. 14 provides a block diagram of a system for generating feature(s). System 1400 includes a computing device 1440. In one or more embodiments, the computing device 1440 includes one or more input interface(s) 1444 for receiving information exchanged in system 1400 such as information related to character data (e.g., character data indication 1462). Character data can be used for generation of feature(s).

The character data in some embodiments is stored in an electronic database (e.g., database 1430) comprising multiple documents (e.g., document 1432A and document 1432Z). The electronic documents can pertain to different observations (e.g., a respective entity of multiple entities). For example, the database 1430 could be a public database containing sustainability reports on environmental activities of different corporate entities. As another example, the database 1430 could be a private database containing usage statements on different individuals (e.g., telecommunication, utility, and/or banking statements). In some examples, the database 1430 stores data from a variety of public and private databases. The database 1430 can be at a remote computing system 1410 in the system 1400 that is remote from computing device 1440. The remote computing system 1410 can be, for example, at a location different than the computing device 1440.

The system 1400 is configured to exchange information, messages, or data between devices or systems in the system 1400 (e.g., via wired and/or wireless transmission). For example, a network (not shown) can connect computing device 1440 with one or more other devices of remote computing system 1410. However, in some embodiments some components of the system 1400 can have protections from network communication in system 1400. For instance, the database 1430 can be one in which the computing device 1440 is not authorized to access (e.g., to protect the privacy or security of the information in the database 1430), while memory locations or databases in the computing device 1440 (e.g., computer-readable medium 1450) are ones authorized for access by the computing device 1440.

Additionally, the computing device 1440 includes output interface(s) 1446 for outputting information such as information pertaining to features generated from character data (e.g., feature(s) 1482 or model information 1454). For instance, model information 1454 could include information indicating one or more machine learning models using feature(s) 1482 or one or more scorecard data models based on generated machine learning models using feature(s) 1482.

The computing device 1440 can receive an indication of character data in many ways. For instance, the computing device 1440 can receive character data indication 1462 by receiving an electronic file containing the character data or receiving a location of the electronic file. Alternatively, or additionally, the computing device 1440 receives an indication of character data by receiving the character data itself (e.g., disconnected or extracted from its original document). In some embodiments, an extraction application 1420 can be used to extract some or all identifying information from the character data before receipt of the character data. Computer instructions related to the extraction application 1420 can be stored at remote computing system 1410 and/or at computing device 1440. In some embodiments, the input interface(s) 1444 can receive information (e.g., character data indication 1462) using a display 1490. For instance, receiving an indication of a selection of an electronic file containing the character data.

Character data can be unsuitable for generation of features when it is unstructured. Further, in some situations character data can comprise identifying information that could identify a given entity when disclosed or misused. For instance, the identifying information could contain personal data that identities an identity or contact information for an entity (e.g., names, phone numbers, email address, birth dates, social security numbers, biometric data, and physical, physiological, genetic, mental, economic, cultural or social identity information). Disclosure or misuse of this type of information could harm an individual and/or violate regulations. Alternatively, or additionally, character data could include identifying information containing restricted or confidential information (e.g., health status information, trade secrets, and government protected data). Disclosure or misuse of this type of information could harm an individual or corporation and/or violate private agreements or regulations. As another example, the character data could include identifying information related to traits inherent to members of entities associated with the documents 1432 (e.g., gender or marital status). These difficult to change identity traits can be harmful if used in machine learning models or regulations may apply to their use (e.g., machine learning model for loan approval that made it harder for a loan approval grant where a person is unmarried could be regulated). One or more embodiments can extract a subset of character data to exclude the identifying information and generate features from the character data and/or a subset of the character data with excluded identifying information so that the identifying information is not used or stored by the computing device 1440.

As an example, the computing device 1440 has a computer-readable medium 1450 and a processor 1442. Computer-readable medium 1450 is an electronic holding place or storage for information so the information can be accessed by processor 1442. Computer-readable medium 1450 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1442 executes instructions (e.g., stored at the computer-readable medium 1450). The instructions can be carried out by a special purpose computer, logic circuits, or hardware circuits. In one or more embodiments, processor 1442 is implemented in hardware and/or firmware. Processor 1442 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1442 in one or more embodiments can retrieve a set of instructions from a permanent memory device and copy the instructions in an executable form to a temporary memory device that is generally some form of RAM, for example. Processor 1442 operably couples with components of computing device 1440 (e.g., input interface(s) 1444, with output interface(s) 1446 and with computer readable medium 1450) to receive, to send, and to process information.

In one or more embodiments, computer-readable medium 1450 stores instructions for execution by processor 1442. In one or more embodiments, one or more applications stored on computer-readable medium 1450 are implemented in software (e.g., computer-readable and/or computer-executable instructions) stored in computer-readable medium 1450 and accessible by processor 1442 for execution of the instructions. For example, in one or more embodiments, the computer-readable medium 1450 comprises instructions for a feature application 1460. The feature application 1460 can generate structured data from character data by generating multiple structured data terms 1472 and store the multiple structured data terms in respective data elements of multiple memory blocks in computer-readable medium 1450 (e.g., in structured data database 1470). The character data can be extracted data (e.g., using extraction application 1420). The feature application 1460 can generate feature(s) 1482 for a machine learning model based on the structured data and store the feature(s) 1482 in a features database 1480. For instance, feature application 1460 can generate a feature using two or more structured data terms of multiple structured data terms (e.g., at least two structured data terms in different memory blocks). Alternatively, or additionally, feature application 1460 can generate a feature using data manipulation of a structured data term in a memory block. These data manipulations or cross data feature generation, can provide a computer solution for feature generating that avoids access or disclosure issues by obscuring original information and/or extracting only the most relevant information. This can be particularly useful where there are privacy, regulation or authorization issues with access to character data.

Further embodiments can be particular useful for generating machine learning models or scorecard data models. For instance, the features can be stored in a features database 1480. In some cases, a machine learning model application 1452 can use the features database 1480 to generate model information 1454. For instance, the machine learning model application 1452 can be used to generate, using feature(s), a machine learning model for making one or more predictions for multiple entities. Additionally, the machine learning model application 1452 can generate, based on a machine learning model, a scorecard data model that applies the machine learning model to generating a scorecard. This scorecard data model can be used for different entities than the one related to documents 1432. In this way the documents can be used to create a data process or data tool for further evaluation and assessment of other entities than those related to generating a machine learning model.

One or more applications, such as extraction application 1420, feature application 1460 and/or the machine learning model application 1452, can be integrated with other analytic tools. As an example, the one or more applications are integrated with data analytics software applications and/or software architectures such as that offered by SAS Institute Inc. or JMP Statistical Discovery LLC of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

One or more applications stored on computer-readable medium 1450 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into system 1400. For example, display 1490 can be integrated into computing device 1440 and input interface(s) 1444 and output interface(s) 1446 are internal interface. The database 1430 or electronic documents 1432 can be stored at the computing device 1440 or directly accessible to computing device 1440. As another example, the same interface supports both input interface(s) 1444 and output interface(s) 1446. For example, a touch screen provides a mechanism for user input and for presentation of output to the user. Alternatively, input interface(s) 1444 have more than one input interface that uses the same or different interface technology. Alternatively, or additionally, the output interface(s) 1446 have more than one output interface that uses the same or different interface technology. The one or more applications can be consolidated into a single application or functions arranged in applications differently than shown in this example.

In one or more embodiments, a computing system described herein (e.g., computing device 1440 or system 1400) implements a method as described herein (e.g., a method shown in FIGS. 15A, 15B, 16A, 16B and/or 17) for generating feature(s) or using generated feature(s).

Figure 15A:
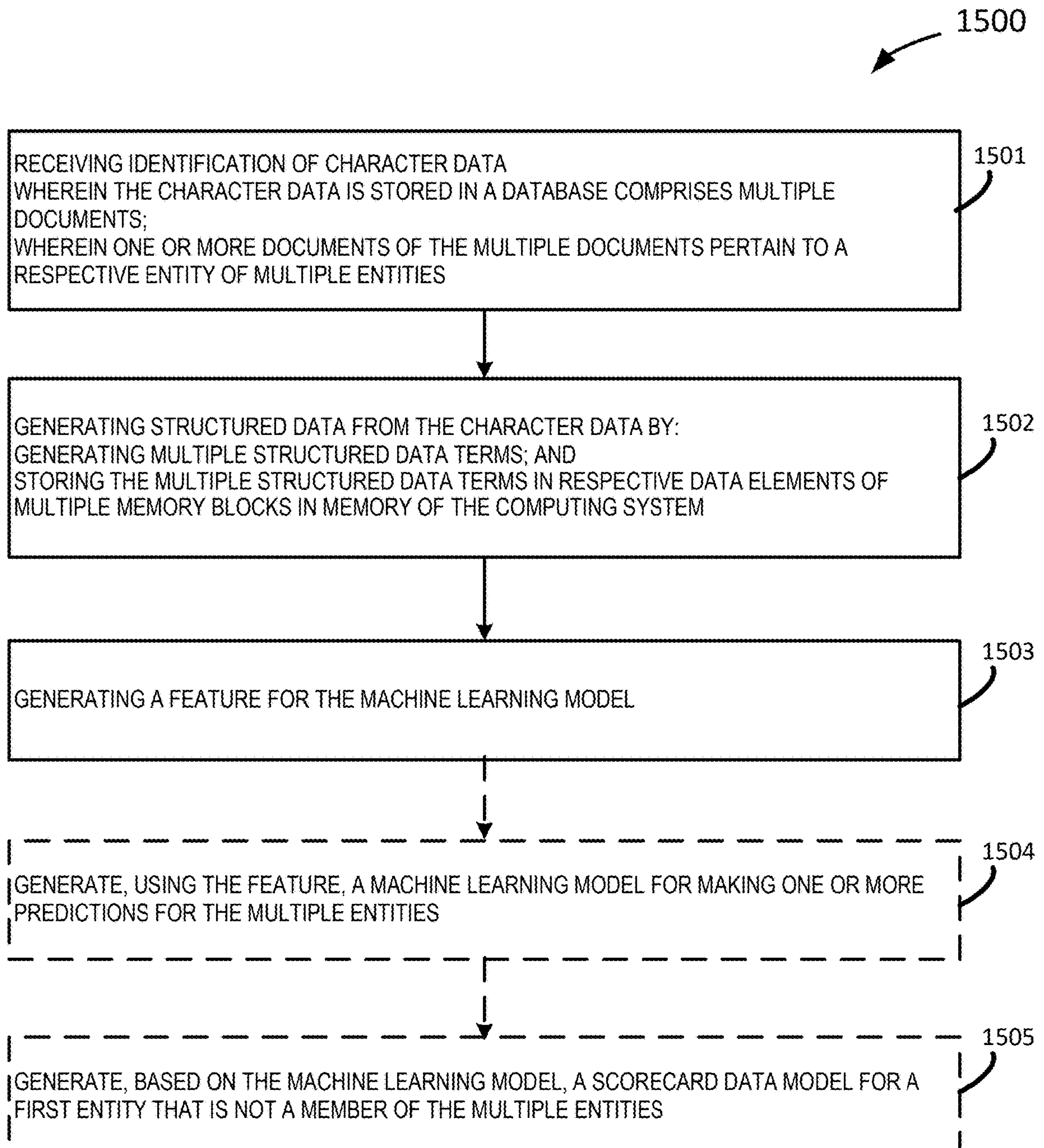
FIGS. 15A-15B illustrate a flow diagram for generating feature(s) according to at least one embodiment of the present technology.

FIG. 15A illustrates a flow diagram of a method 1500 for generating feature(s). An operation 1501 includes generating feature(s) for a machine learning model by receiving identification of character data where the character data is stored in a database comprises multiple documents. One or more documents of the multiple documents pertain to a respective entity of multiple entities (e.g., multiple usage statements pertaining to different individuals).

An operation 1502 includes generating structured data from the character data by generating multiple structured data terms (e.g., water usage or electricity usage data terms), and storing the multiple structured data terms in respective data elements of multiple memory blocks in memory of the computing system.

An operation 1503 includes generating the feature for the machine learning model. For example, the generating the feature can be based on one or more of: at least two structured data terms of the multiple structured data terms (e.g., a ratio of water and electric usage totals) where the at least two structured data terms are in different memory blocks of the multiple memory blocks. Alternatively, or additionally, the generating the feature can be based on data manipulation of a structured data term in a memory block of the multiple memory blocks (e.g., a total score for water usage).

In some embodiments, the feature can be a candidate for an independent variable of a machine learning model. The method 1500 can optionally include an operation 1504 for generating, using the feature, a machine learning model for making one or more predictions for the multiple entities (e.g., predicting a loan approval process based on a total of water usage). For instance, the feature can be an independent variable of the generated machine learning model. A computing system can select a feature that is found to be a predictive indicator for making one or more predictions for entities of the dataset based on the generated machine learning model.

In some embodiments, the method 1500 optionally includes an operation 1505 for generating, based on the machine learning model, a scorecard data model for a first entity that is not a member of the multiple entities. For instance, a feature could be a predictive indicator for a machine learning model to make an approval computer-generated recommendation and/or a disapproval computer-generated recommendation for a new entity that is not a member of the multiple entities (e.g., an admissions approval, a loan approval, a credit card approval for a new individual).

Figure 15B:
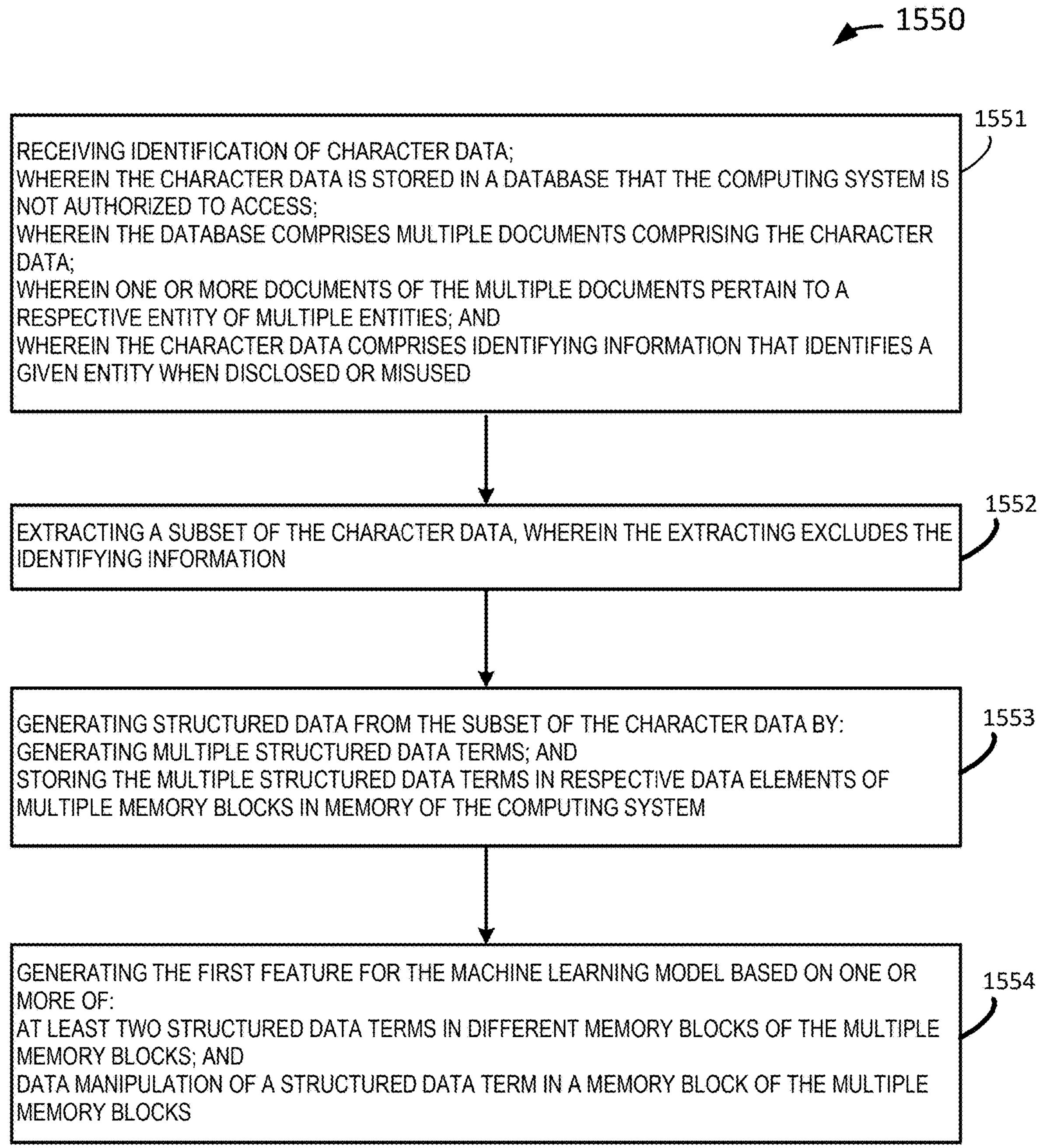

In some situations, character data used for generating feature(s) according to method 15A can have identifying information. FIG. 15B illustrates a flow diagram of a method 1550 for generating feature(s) from character data that includes identifying information. Operation 1551 includes receiving identification of character data. In this example, the character data is stored in a database that the computing system is not authorized to access. The database comprises multiple documents comprising the character data. One or more documents of the multiple documents pertain to a respective entity of multiple entities. The character data comprises identifying information that identifies a given entity when disclosed or misused.

An operation 1552 comprises extracting a subset of the character data. The extracting excludes the identifying information. For example, a computing system could refrain from storing, in memory authorized for access by the computing system, the identifying information. As another example, the character data could be temporarily stored in memory authorized for access by the computing system, and the computing system could exclude the identifying information by removing, from the memory authorized for access by the computing system, the identifying information prior to generating structured data, feature(s), and/or a machine learning model(s).

An operation 1553 includes generating structured data from the subset of the character data by: generating multiple structured data terms; and storing the multiple structured data terms in respective data elements of multiple memory blocks in memory of the computing system.

An operation 1554 includes generating the first feature for the machine learning model based on one or more of: at least two structured data terms of the multiple structured data terms; and data manipulation of a structured data term in a memory block of the multiple memory blocks. The at least two structured data terms can be in different memory blocks of the multiple memory blocks.

The operations described with respect to FIG. 15B can be used in conjunction with the method 1500 in FIG. 15A (e.g., the first feature described in FIG. 15B can be the feature generated in FIG. 15A). Alternatively, or additionally more or less operations can be used than shown in the examples in FIG. 15A-15B. For instance, operations can be combined or optionally included as described.

Figure 16A:
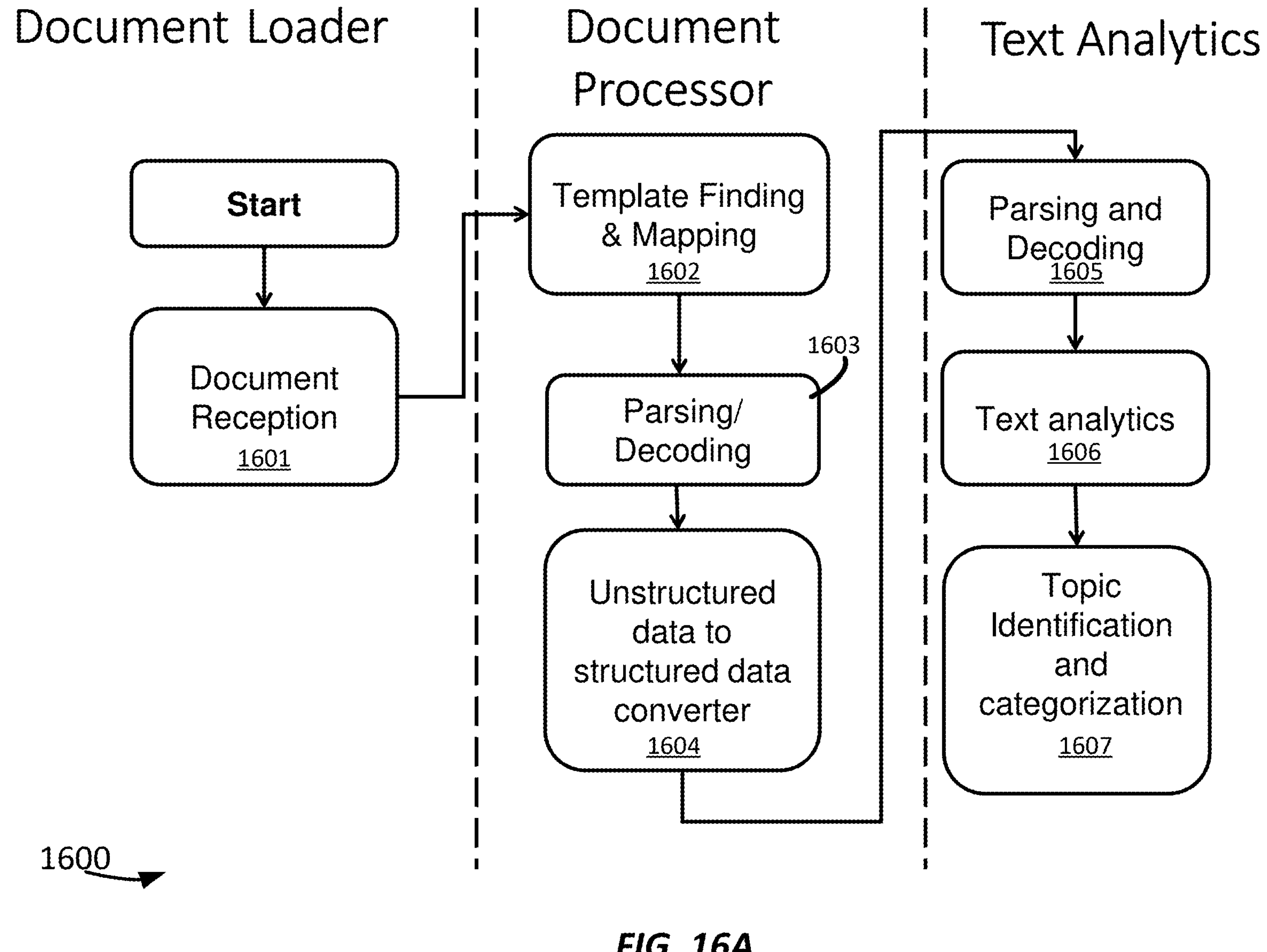
FIG. 16A illustrates an example flow diagram for text analysis according to at least one embodiment of the present technology.

FIG. 16A illustrates an example flow diagram of a method 1600 for specific operations for generating features. In a first document loader phase a document reception operation 1601 includes receiving documents that can include character data (e.g., utility bills, bank statements and telecommunication bills). In a document processor phase in a template finding and mapping operation 1602 includes identifying the type of document for mapping the appropriate template. For instance, in an embodiment a computing system could be subject to data protection regulations (e.g., a General Data Protection Regulation, GDPR), and a computing system could receive a template indicating an adequacy or relevance limitation for data collection so that restricted data is not extracted. In a parsing/decoding operation 1603 includes parsing and/or decoding documents to determine unstructured data. In an unstructured data to structured data converter operation 1604 unstructured data is converted to structured data. For example, electronic documents (e.g., in a portable document format, PDF, form) related to utility bills, bank statements and telecommunication bills can be converted into a structured format using machine learning algorithms.

In a text analytics phase of method 1600, a computing system can perform data categorization for feature generation (e.g., using text mining and text analytics on description of various activities found in an electronic document). For instance, FIG. 16A shows a parsing and decoding operation 1605 and text analytics operation 1606. A computing system can also use text analytics in response to receiving adequacy or relevance limitations for data collection (e.g., to exclude gendered text indications), and/or can be done dynamically. For instance, dynamically allocating, based on text mining of the subset of the character data, memory block(s) based on what is found within the text; and generate first feature(s) based on one or more structured data terms of the allocated memory blocks. A topic identification and categorization operation is shown in operation 1607. For instance, a computing system can bifurcate data per header items (e.g., spend, transfer, salary, loan, credit, debit, utility bill, telecommunication bill).

Figure 16B:
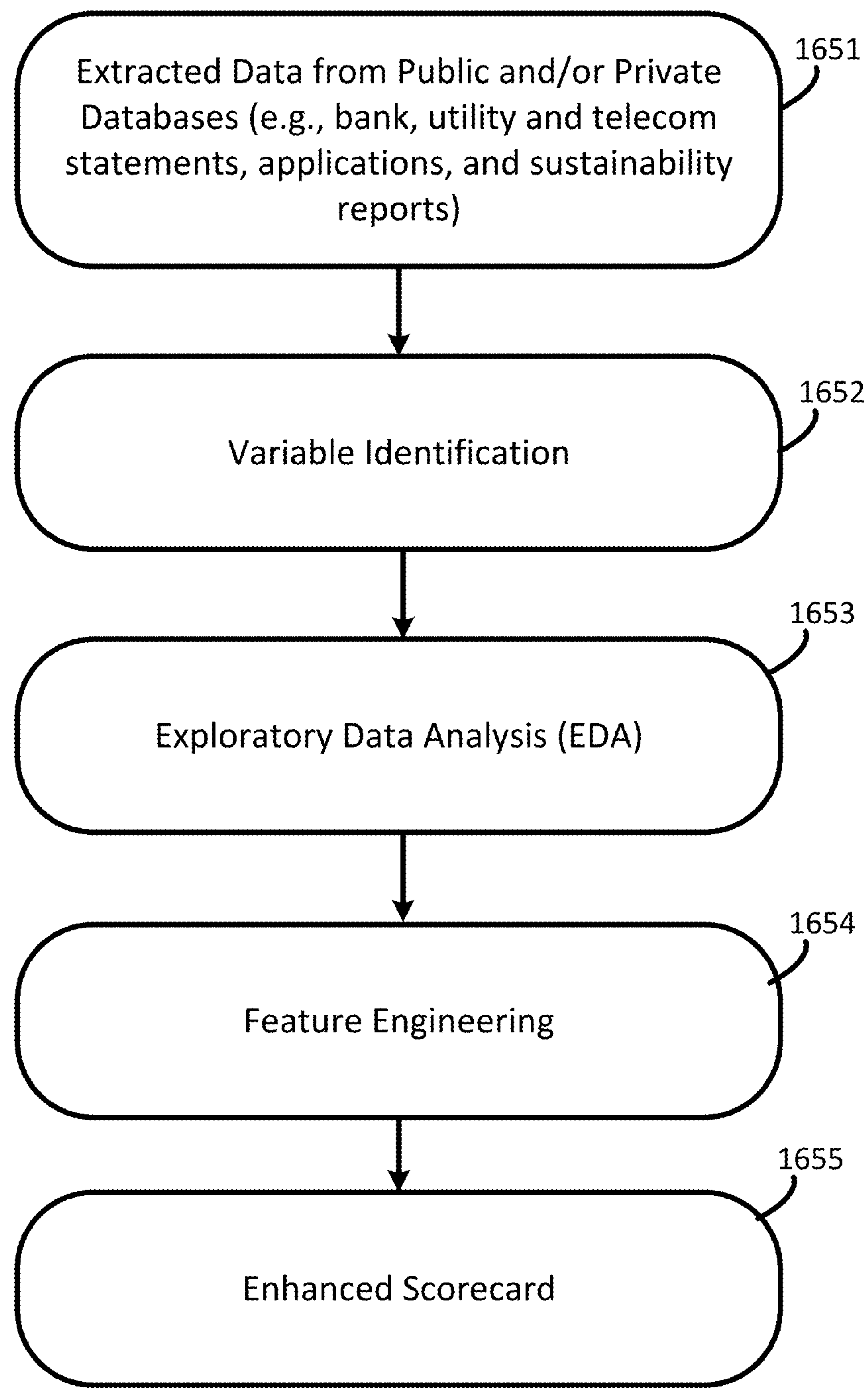
FIG. 16B illustrates an example flow diagram for an enhanced scorecard according to at least one embodiment of the present technology.

Extracted data (e.g., using the method 1600 in FIG. 16A) can be useful for developing a scorecard (e.g., a utility scorecard, telecommunication scorecard, a banking scorecard, and an environmental, social, and/or governance (ESG) scorecard). For instance, FIG. 16B illustrates an example flow diagram of method 1650 for generating an enhanced scorecard data model. In an operation 1651 a computing system obtains extracted data from public or private databases (e.g., extracted data processed according to method 1600 in FIG. 16A). The computing system identifies variables in a variable identification operation 1652. In an Exploratory Data Analysis (EDA) operation 1653, the computing system analyzes, investigates, and/or summarizes new data for generating features. The computing system generates features in a feature engineering operation 1654. The computing system generates an enhanced scorecard data model in an enhanced scorecard operation 1655. A scorecard data model can be considered an enhanced scorecard data model where it improves an existing model for a scorecard, it derived based on generated features, or both.

Figure 17:
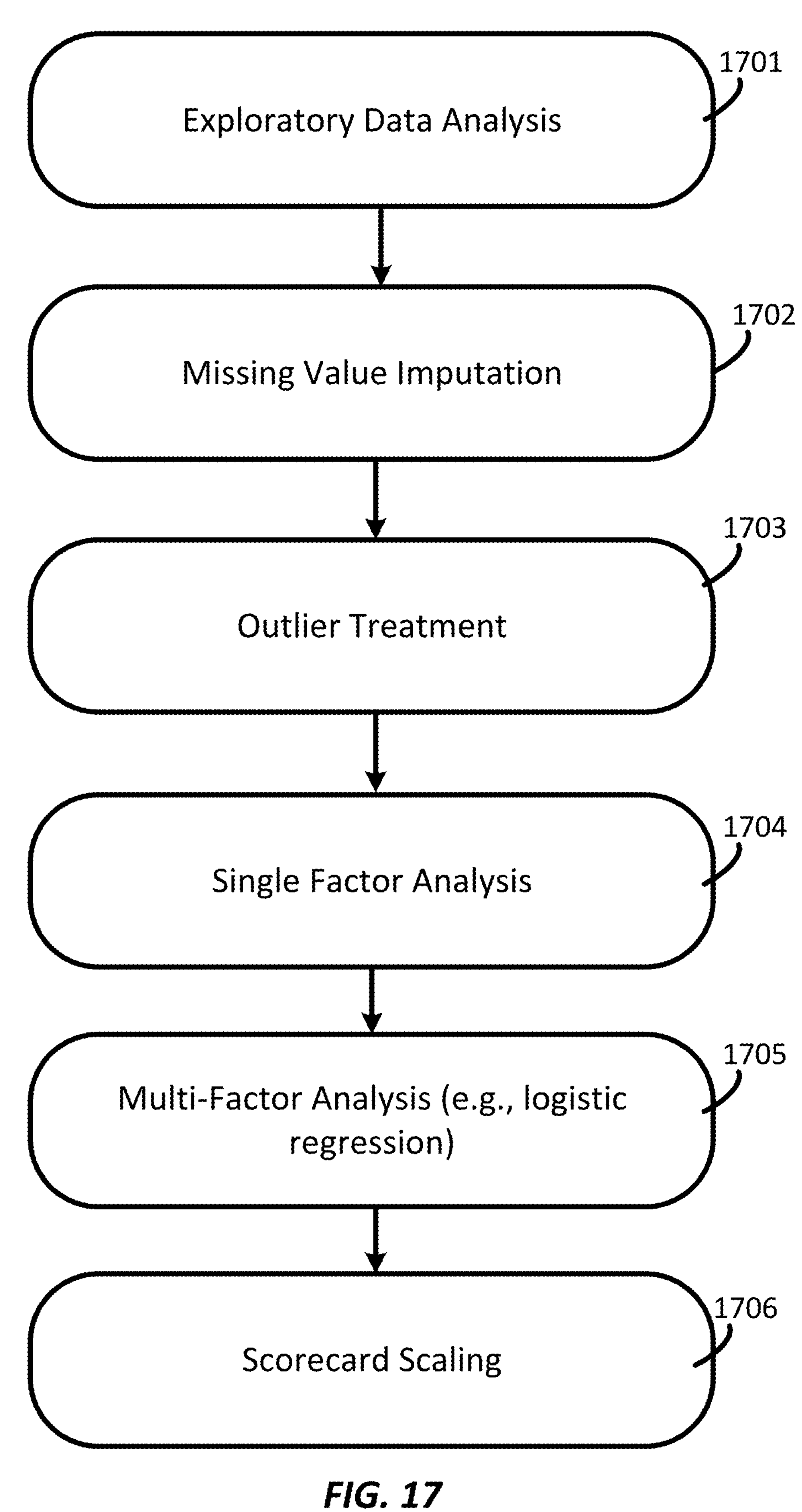
FIG. 17 illustrates an example flow diagram for generating a model for a scorecard data model according to at least one embodiment of the present technology.

FIG. 17 illustrates an example flow diagram of a method 1700 for generating a scorecard data model. Operation 1701 provides for an exploratory data analysis (EDA). Operation 1702 provides for missing value imputation. Since embodiments use unstructured data, data may not be available for all observations. A computing system can determine there are missing values for structured data and generate computer-generated values for structured data. A computing system can use the computer-generated values to develop a computer model. For instance, an operation 1703 allows for treatment of outliers (e.g., removing outliers). Operation 1704 allows for single factor analysis. Operation 1705 allows for multi-factor analysis. Operation 1706 allows for scorecard scaling. Additionally, embodiments can provide one or more operations in a virtual, private environments for secure model training and inference to prevent unintentional data exposure during processing.

FIGS. 18A-18B illustrate an example model assessment for a baseline model developed based on provided structured data. Described embodiments improve this baseline model to show improvement based on included character data. In this example, FIG. 18A shows a table 1800 of variables for a computer model developed based on data derived from information provided by customers applying for a personal loan product. This provided data could be structured data (e.g., structured data from entered information provided by an entity or individual in an application document or graphical user interface). In this example, a computing system selected data pertaining to entities from an observation period of 5 years and performance window of 12 months. Delinquent target event is 90 days past due (DPD) in next 12 months. The data included 1002 observations. Serial No. column 1801 of table 1800 numbers the variables. Variable Name column 1802 provides a name for the variables used in developing the model and Variable Description column 1803 provides a description of those variables. As shown, nine candidate input variables are used (serial numbers 1-9), and 3 target variables (serial numbers 10-12).

FIG. 18B shows a graphical user interface 1840 showing an assessment of the model developed for variables shown in FIG. 18A. As shown in table 1850 of graphical user interface 1840, a computing system selected 6 variables for inclusion in the scorecard data model from the nine input variables shown in FIG. 18A. Variable identifier column 1851 shows the variable identifier in the computing system for generating the model. Variable column 1852 shows the variable name and coefficient column 1853 shows the coefficient value representing the influence of a particular variable on the output for a computer model. For instance, a variable relating to an individual owning their own car had less of an impact on whether an individual would be delinquent than the debt-to-burden ratio (dbr). The scorecard data model in this example can be expressed in the form where p is the prediction:

$$\log\frac{p}{1-p} = -3.11 + 0.74\,V1 + 0.78\,V2 + 1.02\,V3 + 0.29\,V4 + 0.7\,V5 + 0.66\,V6$$

Graphical user interface 1840 shows an assessment of this model with an area under the curve (AUC) for developmental sample and validation sample of 0.82 indicating the model had decent predictive power for use in underwriting the personal loans. However, the data for deriving the model is based on user-supplied structured information (e.g., supplied core customer data supplied on an application form). Building the risk scorecard data model from the core customer data (e.g., age, salary, DBR, employment details, etc.) gave a solid baseline model. The AUC here reflects the typical predictive power of structured demographic and financial data for that purpose, which can provide decent discriminatory power but might lack nuances tied to actual spending and cash flow. Embodiments improve upon this initial model by using a computing system to analyze other information pertaining to an individual (e.g., reading unstructured data such as from PDF documents and then converting it into structured form to create additional features for computer modeling). A computing system can use additional features from extracted character data to develop and enrich scorecard data models. This approach gives more accurate scores with respect to customers and helps increase the accuracy for different scorecards as shown herein.

Figure 19B:
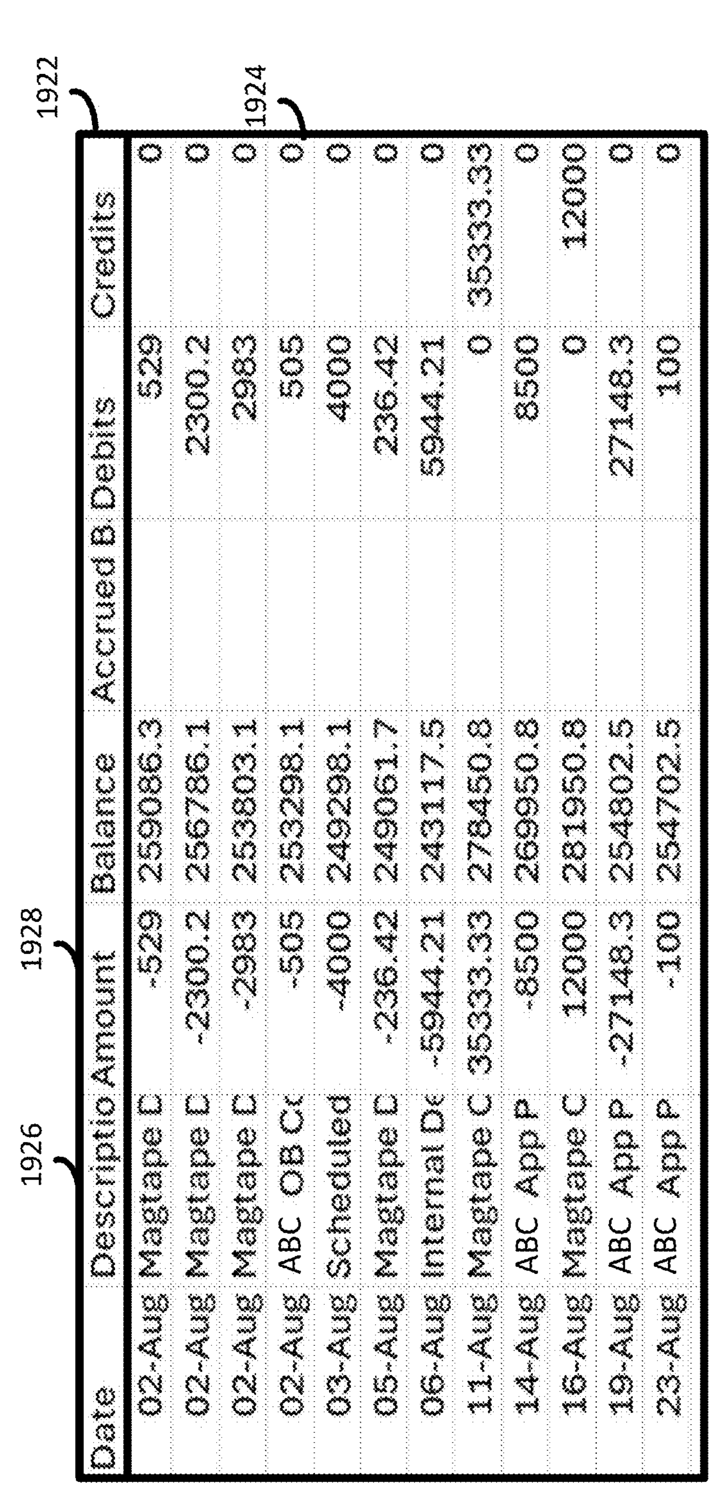

For instance, a computing system can obtain character data from documents generated by other entities other than the entities studied for the machine learning model. FIGS. 19A-19D illustrate extracted data from a private database including bank statements with unstructured character data including letters, numbers, and symbols (e.g., "%" or ","). FIG. 19A shows a bank statement 1900, which is an example of a bank statement that can be prepared by a third party about a corporate entity. The bank statement could be in different electronic file formats such as pdf. Adding data extracted from bank statements introduces a more dynamic view of the customer. Variables like transaction volume, spending patterns on luxury items or travel, and cash flow consistency can provide an enriched picture of financial health. This can significantly enhance a computer model's performance, likely increasing AUC by capturing behavior-driven risk factors that traditional demographic variables miss. However, identifying information can accompany this behavior information (e.g., identifying information such as value-added tax (VAT) registration number section 1902 or specific transaction information in table 1904). Specific transaction information could further include personal data that could identify an entity or contact information for another entity unconnected to the specific approval process (e.g., personal names or card information). Alternatively, or additionally, the transaction information could include traits inherent to individuals whose meaning can be determined using computer semantic text processing. For instance, one of the transaction in table 1904 lists a "Scheduled Payment to Mrs. L. XYZ". This transaction provides personal data related to "L. XYZ". Additionally, it indicates several traits related to an individual including a marital status and gender for "L. XYZ" by including "Mrs.". Embodiments can exclude this information when extracting character data for feature generation.

FIG. 19B shows a table 1920 of structured data from a bank statement. A computing system can generate headers corresponding to headers row 1922 to categorize character data extracted from a bank statement like bank statement 1900. Identifying information is excluded in this form (e.g., VAT registration numbers). Structured data terms are in section 1924 and are associated in memory blocks with respective headers corresponding to headers in headers row 1922. However, description column 1926 can still contain personal data, traits, or other confidential information derived from the transaction information.

FIGS. 19C-19D shows Analytical Base Tables (ABT) 1940 and 1960 after further data cleaning and feature engineering (e.g., to extract personal data using text mining). A computing system can use a subset of headers from headers row 1922 for generating feature(s) based on data manipulation of a structured data term or use of multiple structured data terms. Excluding this information can ensure compliance with regulations to protect personal information or ethical regulations protecting model development over traits that individuals cannot easily change like gender and marital status. For example, excluding this information can ensure features themselves are not related to traits that would violate these types of ethical standards for model generation.

For instance, in FIG. 19C, generated headers in headers row 1950 corresponded to candidate features for model development. A computing system can generate feature(s) based on unique data different from original character data. For instance, a computing system can generate unique data based on two or more structured data terms. For example, debt burden ratio (DBR) header 1956 can be based on adding up debt and income found in extracted character data. A ratio can obscure and be different from individual information pertaining to the structured data terms like specific income or debt. As another example, a computing system could generate a feature pertaining to an indexing or scoring based on structured data term(s) (e.g., a high, medium, or low assessment of the DBR). A computing system can store the unique data in memory authorized for access by the computing system that is devoid of identifying information. For example, FIGS. 19C and 19D do not have identifying information from the statement 1900 in FIG. 19A.

As another example, a computing system can generate a feature based on data manipulation of a structured data term. For instance, atm sum header 1954 in FIG. 19C are based on text-mining to identify in the description data atm withdraws and then total amounts determined to be associated with those descriptions from text-mining. FIG. 19D shows additional generated headers related to headers row 1970 corresponding to candidate features for model development. For example, luxury sum header 1972 and luxury count header 1974 in FIG. 19D are each based off of text mining of the description data shown in description column 1926 of table 1920 of FIG. 19B to identify luxury goods. As another example, a computing system generates a feature based on data manipulation of a structured data term in the amounts data shown in amounts column 1928 of FIG. 19B. For instance, luxury sum and atm sum are based on a total pertaining to amounts structured data. Luxury count is based on a count related to amounts structured data. As another example, a computing system can use frequency of luxury items. This data manipulation can obscure restricted or confidential information that may be associated with the luxury items like the amount spent or the nature of the luxury item (e.g., purchasing a boat could indicate a new business venture). Extracting a subset of character data to generate a feature can include identifying restricted or confidential information using text mining and then excluding and/or obscuring that information.

A computing system can also generate an identifier to associate an extracted subset of character data that is related to a particular entity with a respective identifier of the identifiers. For instance, FIG. 19C shows an identifier header 1952. A computing system can store the identifiers in a memory block of memory blocks of a computing system and data in other memory blocks associated with the identifiers such that the associating links data related to a same observation and disassociates data from a particular entity. For instance, data associated with an identifier "1" could be data extracted from a bank statement like bank statement 1900 in FIG. 19A without having to mention the particular bank or bank identifier. In this way a computing system need not retain corporate information like VAT registration numbers to link associated data.

FIGS. 20A-20B illustrate an example model assessment for extracted data from a private database including bank statements like bank statement 1900 in FIG. 19A. In FIG. 20A, table 2000 shows 28 candidate features available for input variables for this computer model. A computing system generated candidate features based on data including character data from bank statements. Variable name column 2002 lists input variables as well as output variables. Serial No. column 2001 assigns a serial number to the variable. Variable description column 2003 describes the variable type. For instance, as shown atm sum, luxury sum, luxury count and DBR where candidate features. FIGS. 19A-19D describe these variables generation in more detail. Of those options, some features are predictive indicators to make one or more predictions for entities in the dataset regarding loan approval.

FIG. 20B shows selected features for a machine learning model in a graphical user interface 2050. A computing system included 10 variables based on the 37 candidate features in a computer model for making predictions for entities of the dataset. A computing system can select variables based on many criteria such as statistical significance to a model and/or business factors. A variable column 2051 shows a variable assigned in the machine learning model. A variable name column 2052 shows the name of the variable. For instance, a computing system selected features pertaining to DBR and atm sum for this model. Selected variables can also have further data manipulations. For instance, this variable list includes a "dbr-calculated" and a "dbr-actual" allowing for the calculated to account also for credit limits. Coefficient column 2053 shows the co-efficient assigned in the computer model. The scorecard data model in this example can be expressed in the form where p is the prediction:

$$\log\frac{p}{1-p} = -3.11 + 0.9\,V1 + 0.6\,V2 + 1.11\,V3 + 0.32\,V4 + 0.63\,V5 + 1.01\,V6 + 0.51\,V7 + 1.11\,V8 + 0.71\,V9 + 0.76\,V10$$

FIG. 20B shows a graphical user interface 2050 showing an assessment of the model developed for variables shown in FIG. 20A. AUC for the development sample is 0.89 and for validation data set is 0.9. This is an improvement over the model assessment shown in FIG. 18B. By including features based on at least two structured data terms (e.g., DBR) and based on data manipulation of a structured data term (e.g., atm sum), the computer model is improved and the scorecard data model enhanced. Generating features from character data in other usage statements can further enhance the scorecard data model.

Figure 21A:
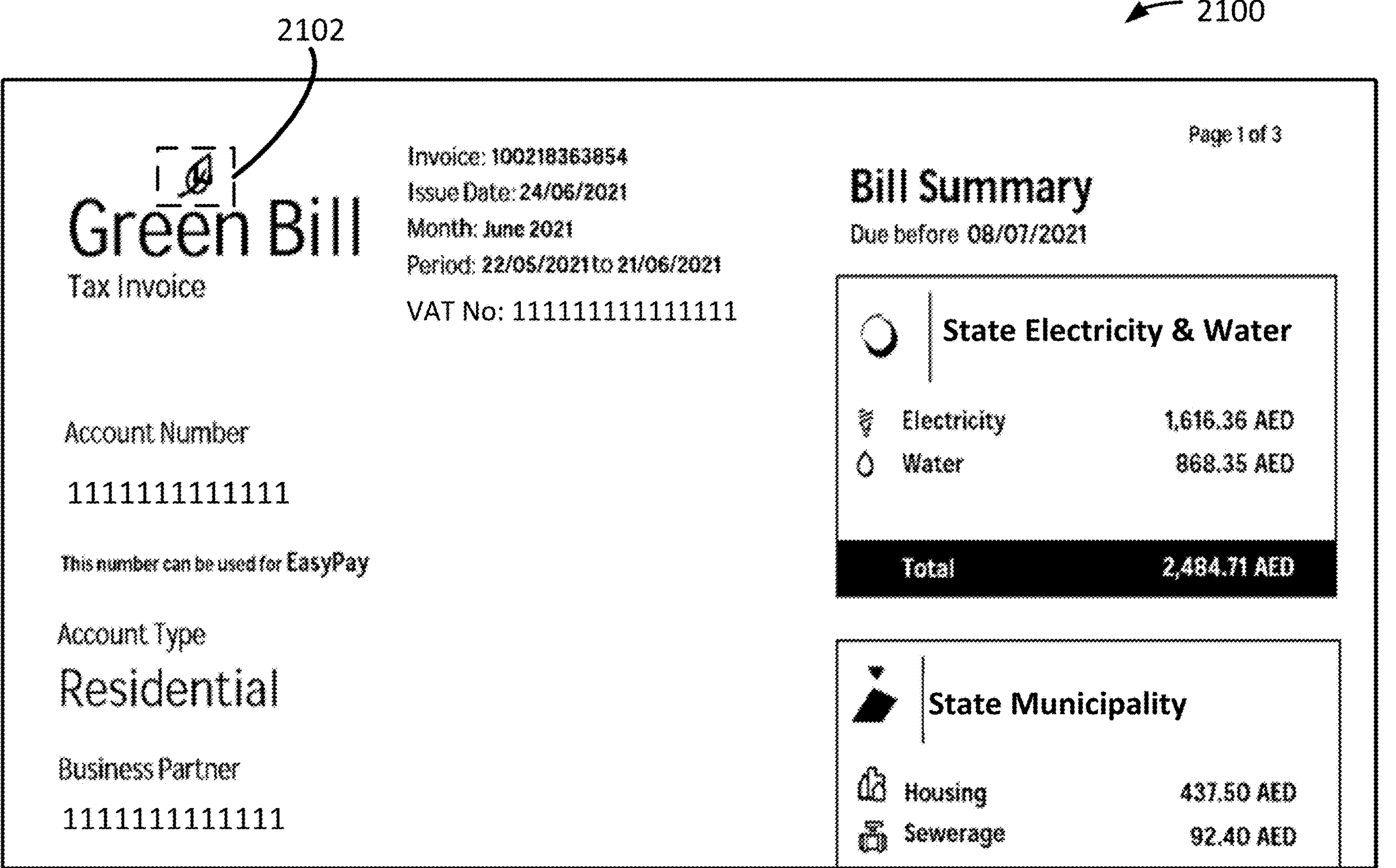

FIGS. 21A-21C illustrate an example model assessment for extracted data from a private database including bank and utility statements. FIG. 21A shows an example utility statement 2100. Incorporating utility bill data should further improve the scorecard's predictive capability. The key here is the consistency of payment behavior, which can be a strong proxy for financial stability, especially when combined with the bank statement data. Regular on-time payments for utilities can be correlated with lower delinquency risk, while any irregularities can flag potential instability. However, these types of statements are generated by entities far from the approval process. They are also presented as unstructured data with images and other formatting that can make it difficult to receive without providing confidential information. For instance, utility statement 2100 has an image logo 2102 that could indicate an entity identity. The utility statement 2100 also has text indicating account numbers, VAT numbers, partner numbers, etc. that could all be identifying information. Embodiments enable character data extraction that excludes identifying information.

FIG. 21C shows a graphical user interface 2160 showing an assessment of the model developed for variables shown in FIG. 21B. 24 additional candidate variables are available from including the utility statements, and 13 variables are included in the scorecard data model. The scorecard data model in this example can be expressed in the form where p is the prediction:

$$\log\frac{p}{1-p} = -3.07 + 0.89\,V1 + 0.67\,V2 + 0.9\,V3 + 0.24\,V4 + 0.77\,V5 + 1.41\,V6 + 1.1\,V7 + 0.88\,V8 + 0.6\,V9 + 1.08\,V10 + 0.62\,V11 + 0.74\,V12 + 0.7\,V13$$

As shown in FIG. 21C, AUC for the development sample is 0.93 and for validation data set is 0.91. This is an improvement over the model assessments shown in FIG. 18B and FIG. 20B. Some features are generated from the additionally character data including V11 "water usage in gallon". However, a computer model can be improved further by include additional usage data.

FIGS. 22A-22D illustrate an example model assessment for extracted data from a private database including bank, utility, and telecommunication statements.

FIG. 22A shows an example telecommunications statement 2200. Telecommunications statements can add another valuable layer for computer modeling such as capturing mobility, connectivity patterns, and potential payment difficulties. Telecommunication statements in this example have short billing cycles, which might reveal early signs of financial distress before it shows up in larger obligations like utilities or loan repayments.

Table 1 contains candidate input variables for a machine learning model with the additional character data from telecommunication statements like telecommunications statement 2200.

TABLE 1

| Candidate Variables |
|---|
| Unique ID of the customer |
| Age of the customer |
| Salary of the customer |
| DBR ratio as per calculation |
| Customer owns a car flag |
| Customer is self-employed flag |
| Years of work experience |
| Customer owns a house flag |
| Number of cards used by the customer |
| Unique ID of the customer |
| Amount of home loan |
| Amount of total loan |
| Number of atm transactions |
| Amount withdrawn from ATM |
| DBR ratio actual |
| Monthly Salary |
| Credit Card Payment Made |
| Amount credited |
| Amount Debited |
| Number of credit transactions |
| Number of debit transactions |
| Amount spent on luxury goods |
| Number of transactions on luxury goods |
| Number of transactions on travel |
| Amount spent on travel |
| Number of total transactions |
| Average transaction Value |
| Amount spent on high-risk merchants |
| Number of transactions on high-risk merchants |
| Amount spent on high essential items |
| Number of transactions on essential items |
| Amount spent on healthcare |
| Number of transactions on healthcare |
| Amount spent on online transactions |
| Number of online transactions |
| Amount spent on international transactions |
| Number of international transactions |
| Account Number |
| Name |
| Premise Owner Name |
| Address |
| Invoice id |
| Period of bill generation |
| KWH electricity usage |
| Water usage in gallon |
| Previous month bill amount |
| Previous month bill payment |
| Electricity usage bill |
| Water usage bill |
| Electricity + Water usage bill |
| Housing Bill |
| Sewerage bill |

TABLE 1-continued

| Candidate Variables |
| --- |
| Housing + Sewerage Bill |
| Total bill |
| Ratio of current month bill to previous month bill |
| Total bill amount due |
| Was the previous month utility bill amount paid in full |
| Electricity usage category |
| CO2 emission |
| CO2 emission category |
| Water usage category |
| Business customer number |
| Customer TRN number |
| Account Number |
| Bill number |
| Bill issue date |
| Bill for period |
| Service rental amount |
| Usage charges |
| VAT charges |
| Current month bill |
| Previous month bill |
| Payment received for previous month |
| Total Charges for this month bill |
| Ratio of this month's charges to previous month charges |
| Was the previous month telecom bill amount paid in full |

FIG. 22B shows a representation of selected variables for features for a machine learning model. Column 2221 shows a serial number of the variable, and a variable name column 2222 provides the variable that is an input variable for a machine learning model in the case of variables 1-15 or an output variable for a machine learning model in the case of variables 16-18 that relate to days delinquent from pay date (DPD). Variable description column 2223 provides a description of the variable.

FIG. 22C shows a graphical user interface 2240 showing an assessment of the model developed for variables shown in FIG. 22B. A computing system included 20 variables in the scorecard data model from 76 available candidate variables. The scorecard data model in this example is expressed in the form where p is the prediction:

$$\log\frac{p}{1-p} = -2.9 + 1\,V1 + 0.52\,V2 + 0.9\,V3 + 0.86\,V4 + 1.43\,V5 + 1.1\,V6 + 1.1\,V7 + 0.64\,V8 + 1.18\,V9 + 0.53\,V10 + 0.64\,V11 + 0.81\,V12 + 0.8\,V13 + 0.7\,V14 + 0.54\,V15 + 0.16\,V16 + 0.95\,V17 + 0.52\,V18 + 0.46\,V19 + 0.06\,V20$$

As shown in FIG. 22C, the incremental improvement in AUC at this stage is notable, as the telecommunications data provides fine-grained, high-frequency behavioral insights. AUC for the development sample is 0.96 and for validation data set is 0.97. This is an improvement over the model assessments shown in FIGS. 18B, 20B, and 21C. The scorecard for this model is robust, reflecting a holistic view of the customer's financial behavior and risk profile. Incorporating unstructured data (bank statements, utility bills, telecommunication data) leads to a significant improvement and data evolution in additional factors that are available for consumption by a scorecard data model.

Figure 22D:
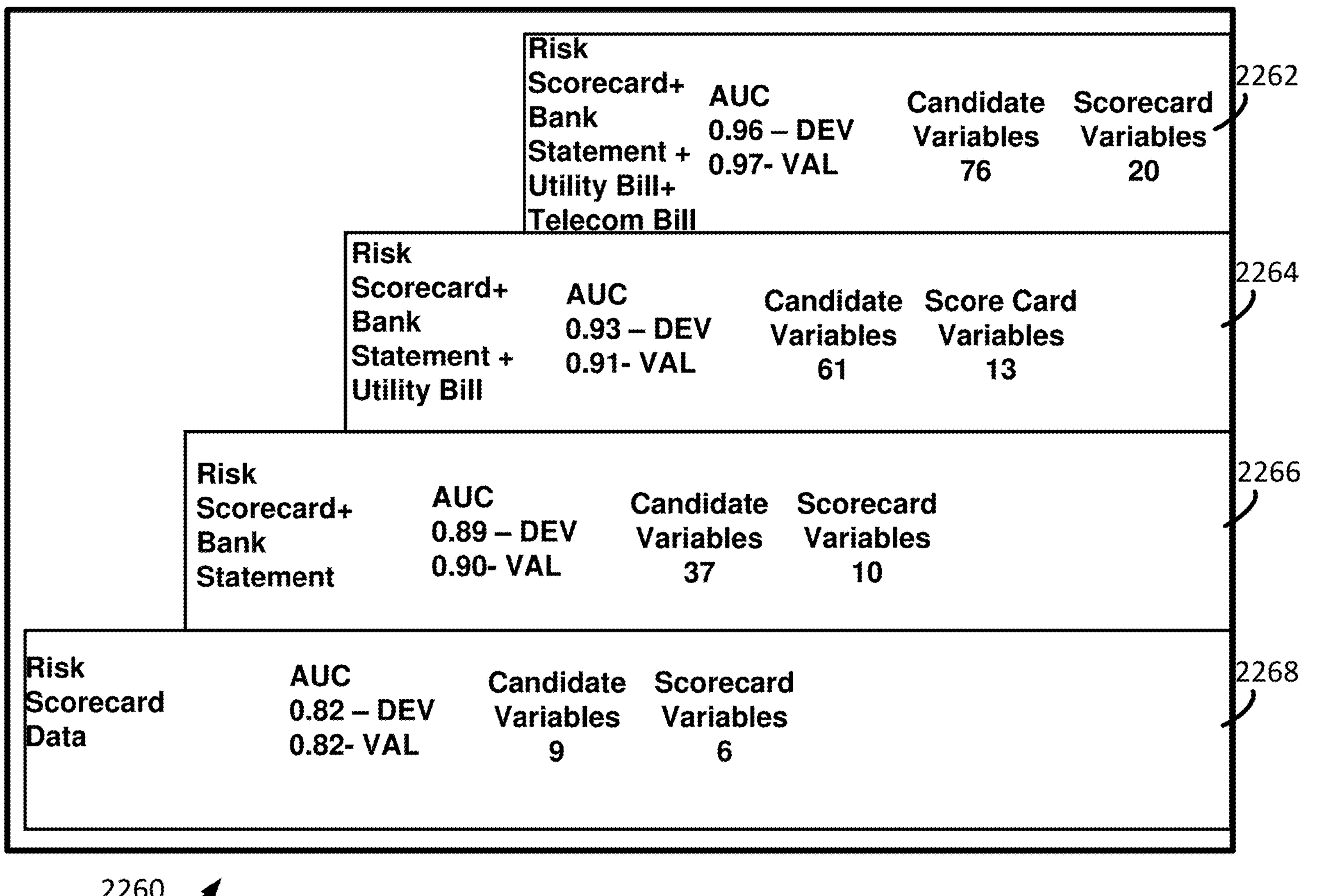

As shown in FIG. 22D embodiments allow for improved assessment of a computer model. For instance, graphical user interface 2260 shows generated assessments representing the incremental benefits of including different datasets. More accurate scorecard predictions enable better decisions. In this specific example, there is an uplift in scorecard performance because AUC improved to 0.96 (with a model according to graphical representation 2262) from 0.82 (with a model according to graphical representation 2268), demonstrating the effectiveness of diverse data sources. The graphical representation 2268 relates to a model derived based on documents generated by an entity studied for the machine learning model. The graphical representations 2262, 2264, and 2266 include character data derived from entities other than the entities studied for generating a model (e.g., financial institutions, utility companies, telecommunication companies). Entities studied for feature engineering, or entities providing documents for feature engineering, may have no authorized access to database(s) holding the documents or access to a computing system developing feature(s) or computer model(s) from the data. These database(s) or computing systems may operate on a variety of protected or confidential documents from different individuals or organizations. Embodiments enable safe model use and access to these confidential documents. In this example, a computing system generated a binary machine logistic regression model, but this approach is applicable to other types of modeling. A computing system can also compare, assess, or present in a graphical user interface different modeling approaches for a dataset for selection of a champion model.

This approach also is a customizable framework allowing for integration of new data sources over time, ensuring the model remains relevant and effective. For instance, as shown in the graph, bank statements could be brought in and then utility bills and telecommunications bills. Alternatively, or additionally, observations points can be updated overtime. For instance, the data for this model was derived from an observation period of 5 years and performance window of 12 months. Delinquent target event is 90 days past due (DPD) in next 12 months. In other embodiments, a computing system can obtain an updated time period (e.g., a shorter or longer observation period or performance window, or a window covering more recent data) and determine different entities associated with that time period. For instance, five years from now the model derivation process could be repeated with different entities in the set, and a computing system generates updated features and/or updated machine learning models based on updated entity data according to the updated time period.

In some embodiments, a user could then select a particular type of machine learning model for a scorecard data model (e.g., generated from one or more different datasets). For instance, the user could select a graphical representation 2262 of a model for use for a scorecard data model because it had the best assessment scores. Alternatively, a user could select a graphical representation 2264 or 2266 in this example, to balance included data and model assessment. Further, in this example, a computing system generated the machine learning model in a virtual, private environment specific to the machine learning model. This further protects the sensitive nature of the data.

Embodiments described show computing systems that can read data from PDF documents to create additional features for computer decision problems. A computing system can transform unstructured data from various types of PDF statements into structured data, which is then utilized for data categorization using text analytics and then used to develop comprehensive risk scorecards. Embodiments can handle a wide range of documents including utility bills, electricity bills, telecommunication bills, bank statements and more, ensuring versatile and robust data processing capabilities. This process has broad applicability for use in multiple industries beyond banking activities such as loan and credit card approval. For example, embodiments can be useful for customer segmentation and environmental, social and governance (ESG) scorecards.

FIGS. 23A-23C illustrate an example for an ESG scorecard data model. A computing system extracts character data from a public database including sustainability reports. FIG. 23A shows an example sustainability report 2300. A sustainability report can include information provided by an entity such as a government on their environmental, social and governance performance. In this example, the sustainability report 2300 provides environmental related information in an electronic file such as pdf. Using embodiments described herein for document intelligence and text mining, FIG. 23B shows a structured data table 2330 developed based on the character data in the sustainability report 2300 in FIG. 23A. FIG. 23C shows an Analytical Base Table (ABT) 2360 containing generated features from the structured data table 2330. This dataset can be used for building a machine learning model.

Table 2 contains candidate variables generated using the structured data table 2330.

TABLE 2

| Candidate Variables |
|---|
| Operating Revenue |
| Profit Margin |
| P/L before tax |
| Number of publications |
| No of companies in corporate group |
| No. Women Directors |
| BvD Independence Indicator |
| Number of current directors & managers |
| Number of employees |
| Operating revenue (Turnover)th USD Last avail. Yr |
| P/L before tax th USD Last avail. Yr |
| P/L for period [=Net income] th USD Last avail. Yr |
| Cash flow th USD Last avail. Yr |
| Total assets th USD Last avail. Yr |
| Shareholders funds th USD Last avail. Yr |
| Current ratio Last avail. Yr |
| Profit margin (%) Last avail. Yr |
| Energy consumption in megawatt-hours. |
| Water usage in megaliters. |
| Greenhouse gas emissions in tons of CO2. |
| Waste generated in tons. |
| Employee satisfaction percentage. |
| Community investments in thousands of dollars. |
| Diversity index score. |
| Governance rating. |
| Supplier sustainability percentage. |
| Innovation index score. |
| ESG Score of the corporate |

FIGS. 24A-24B illustrate an example model assessment for extracted data from a public database containing sustainability reports (e.g., sustainability report 2300 in FIG. 23A). FIG. 24A shows a table 2400 of input variables and output variables for a machine learning model. The machine learning model in this example is based on 83 observed reports, 10 available input variables from the candidate variables in table 2, and one target output variable (an environmental, social, and governance ESG score). Serial Number column 2401 numbers the 10 available input variables (1-10) and one target output variable "score" (an environmental, social, and governance, ESG, score). Variable name column 2402 identifies the variable and variable description column 2403 provides a description of the variable.

FIG. 24B shows a graphical user interface 2430 showing an assessment of the model developed using linear regression for variables shown in FIG. 22A. The model in this example is expressed in the form where ESG is the ESG score:

$$ESG = 31.52 + 0.002\,V1 + 0.43\,V2 + 6.41\,V3 - 0.38\,V4 - 0.02\,V5 - 0.01\,V6 - 0.1\,V7 + 0.06\,V8 + 0.1\,V9 - 0.15\,V10 - 2.53\,V11\_1 - 4.34\,V11\_2 + 10.77\,V11\_3 - 24.58\,V11\_4$$

Figure 24C:
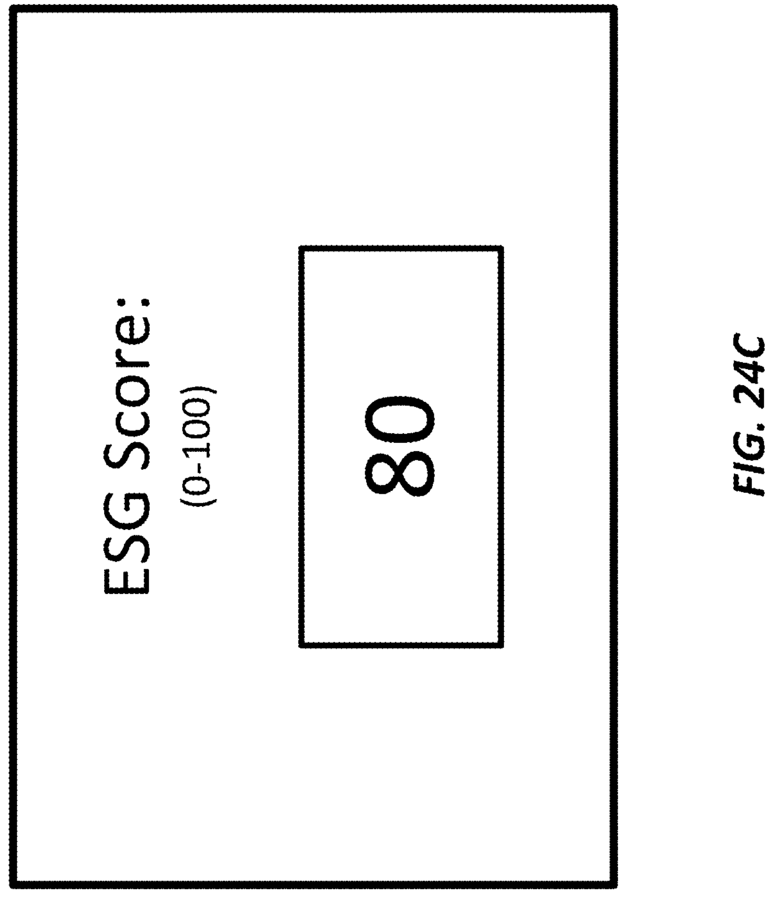

Table 2440 provides variable identifier (ID) column 2441 indicating the variables used in the computing model. Variable column 2442 shows the variable and coefficient column 2443 shows the contribution of the variable to the computing model. In this example, a computing system assessed the ESG model with an $R^2$ value of 0.40 (numbers range between 0 and 1, with closer to 1 indicating a better model). The computing system also assessed the ESG model with a Root mean square error (RMSE) of 18.91 with lower number indicating a better model. A computing system could generate different models, and when the user is satisfied with the scores, the computing system can apply the generated computer model to new entities. FIG. 24C shows an example graphical user interface 2450 with a displayed ESG score (a value between 0 and 100) after a computing system applies the computer model to a new entity.

Figure 25:
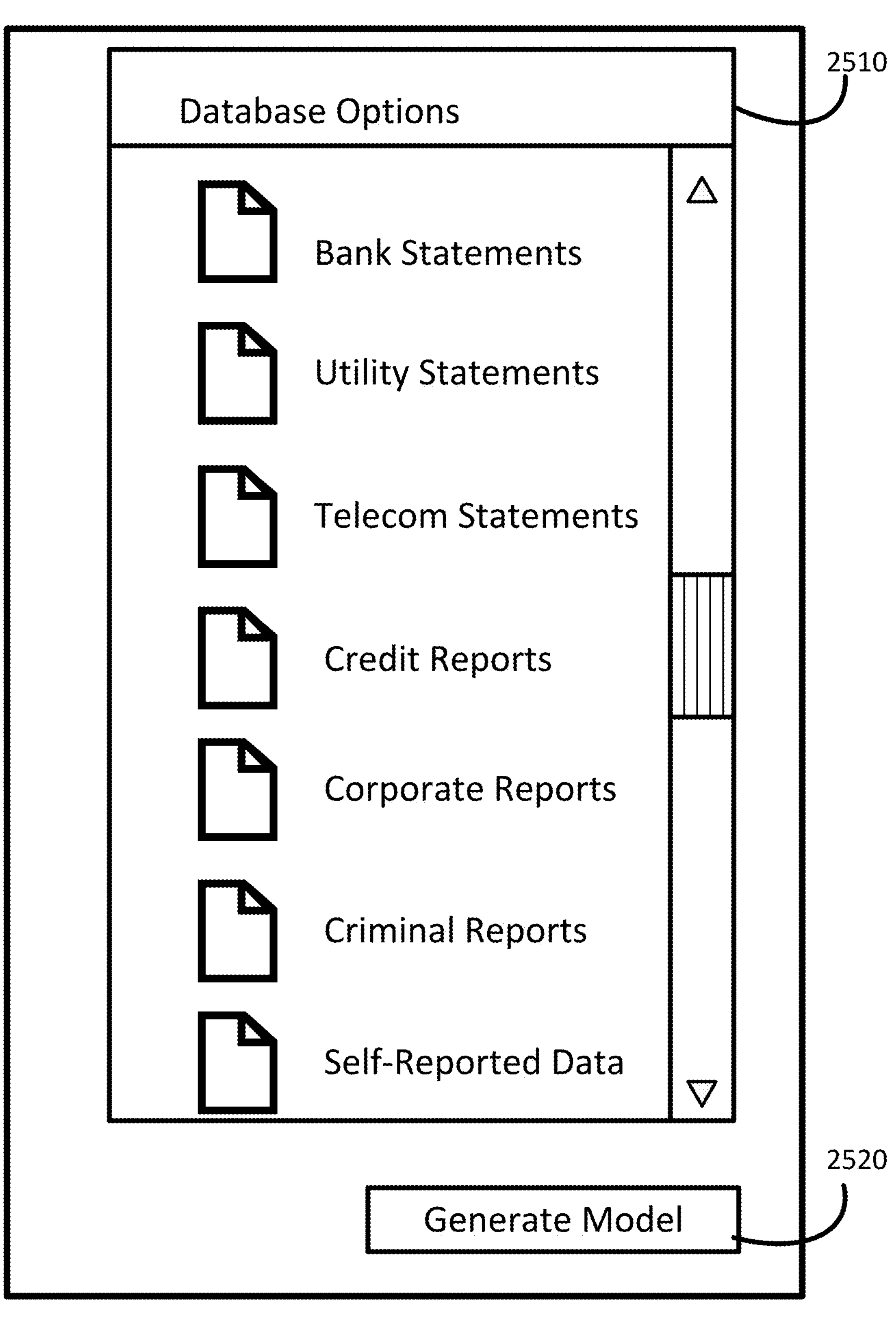
FIG. 25 illustrates an example graphical user interface for model card generation according to at least one embodiment of the present technology.

In some embodiments, receiving identification of the character data for generation of a computer model comprises receiving via a graphical user interface. FIG. 25 illustrates an example graphical user interface 2500 for model card generation. A computing system can obtain character data by receiving a location of an electronic file, or an indication of a selection of an electronic file, containing the character data (e.g., character data including identifying information). For instance, a computing system can receive the indication of a selection or location of an electronic file by selecting particular databases in database options table 2510. Responsive to the selection, the computing system can receive, from selected databases, the character data. By selecting generate model control 2520 a computing system supporting the graphical user interface 2500 (e.g., an application stored on a computing device) can employ algorithms described herein to read and interpret character data from statements contained in selected databases (e.g., PDF documents stored in databases). Alternatively, or additionally, all databases can be used, or particular templates can be selected that will be employed on available databases (e.g., utility statement templates).

In embodiments, a computing system can extract essential information based on selected documents, such as transaction details, billing information, and usage patterns, and convert them into a structured format. By converting unstructured data into a structured format, a computing system ensures that the data is ready for analysis and integration with other systems and/or databases. This process can involve identifying and categorizing key data points, ensuring consistency and accuracy to develop features. A computing system can then generate, using feature(s), a machine learning model for making one or more predictions for entities associated with the statements in database options table 2510. A computing system can generate feature(s) or model(s) based on private, public, or self-reported information, or a combination thereof. Alternatively, or additionally, a computing system can generate, based on the machine learning model, a scorecard data model accessing a prediction for a first entity that is not a member of the multiple entities; store the scorecard data model; and/or display, in the graphical user interface, one or more graphical representations of the scorecard data model.

Figure 26A:
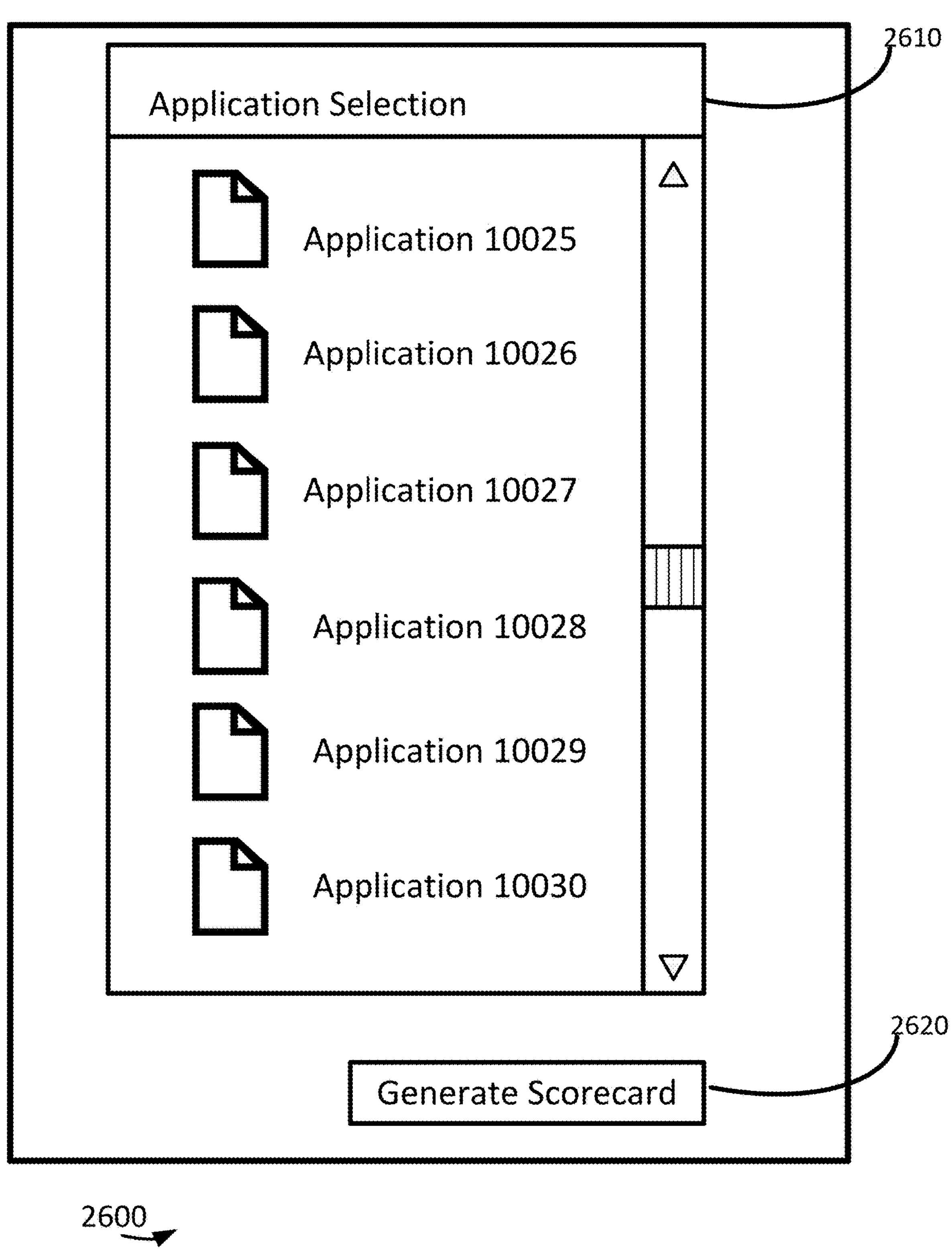
FIGS. 26A-26B illustrate an example graphical user interface for scorecard data model generation according to at least one embodiment of the present technology.
Figure 26B:
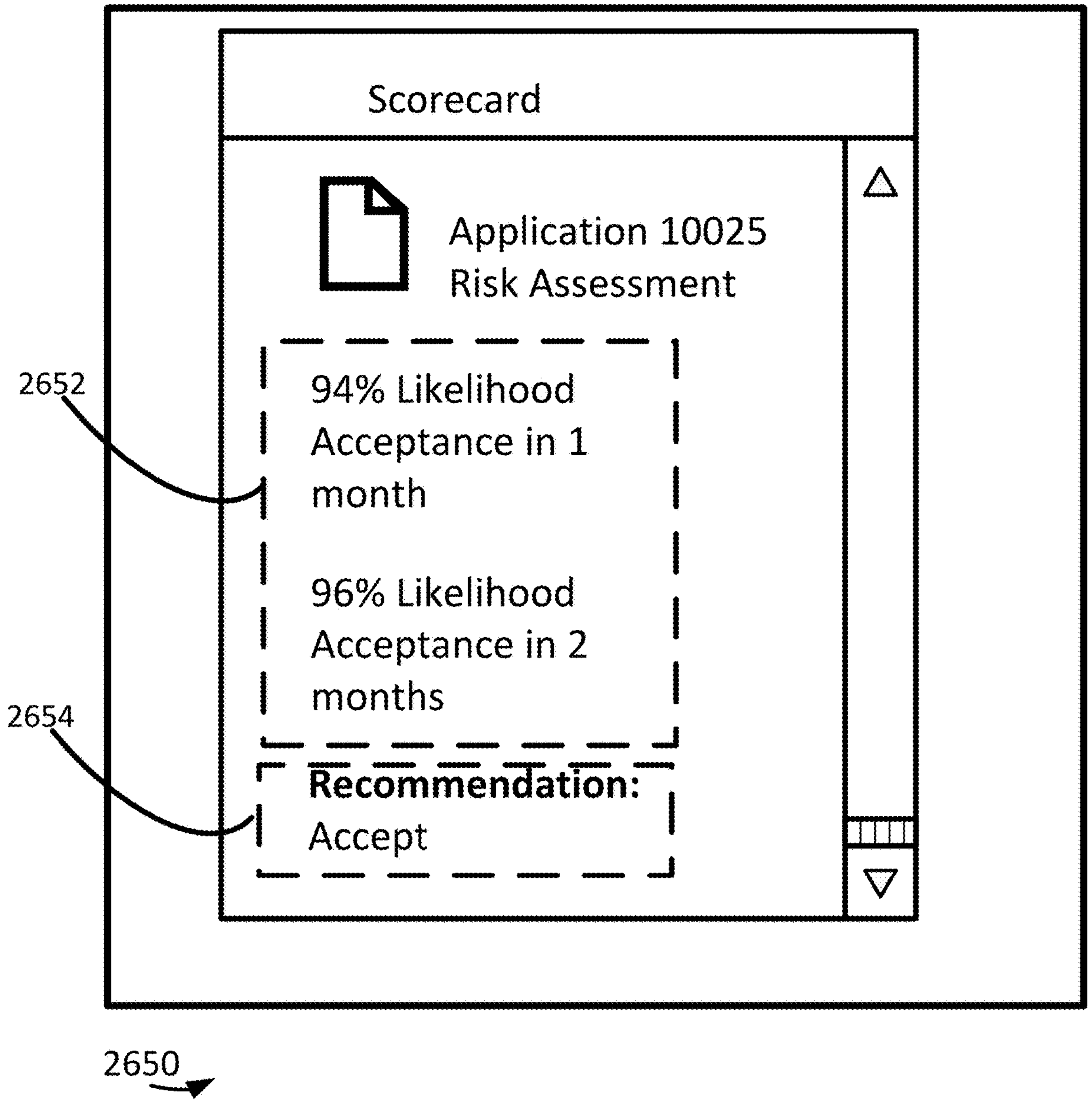

FIGS. 26A-26B illustrate an example graphical user interface 2600 for scorecard generation according to a scorecard data model. This example relates to admissions decisions for admitting a student to a school. Ranking institutions evaluate schools on how many of their admissions spots are accepted by students and how quickly they are accepted. It is preferable to have a model to predict whether to award an admission spot based on likelihood of acceptance of that spot. Once a model is developed, a particular school application for an admissions decision can be selected for applying the model using application selection 2610. Selecting control 2620 generates a scorecard data model for the particular school application.

In embodiments once data is available, it is analyzed by a computing system to identify various topics and categories for identifying various headers in the data. Once structured data is available, the computing system uses advanced analytics to assess various risk factors. Determine features for a machine learning model to make computer generated recommendations for new entities that are not a part of the original dataset. It can evaluate customer behaviors and usage patterns to generate a detailed risk scorecard data model for a new entity. Statements evidencing this behavior or usage may not be readily available in public databases. This scorecard provides valuable insights into potential risks, enabling informed decision-making (e.g., ESG, telecommunications, utilities and banking), while maintain confidentiality and privacy.

In the example, shown in FIG. 26B, the computing system has determined features that are a predictive indicator for machine learning model to make an approval computer-generated recommendation or a disapproval computer-generated recommendation for a new entity that is not a member of the multiple entities and displayed graphical representation(s) of a scorecard data model in graphical user interface 2650. For instance, the computing system generates, using one or more features, machine learning models for making one or more computer-generated recommendations for entities related to likelihood of acceptance of an admission spot. The computing system applied these models to a new entity to determine their likelihood of acceptance within specific time periods as shown in section 2652. The computing system can then generate, based on a machine learning model, a computer-generated approval recommendation for the new entity that is not a member of the multiple entities. For instance, in this case the computing system recommended to award an admission spot in section 2654 of the graphical user interface 2650 because the computing system predicted that there is a high likelihood the student will accept the spot.

One or more embodiments provide improvements to generation of features, machine learning models, and scorecard data models. In some cases, embodiments address issues with privacy and authorization to use character data in remote and/or private databases.

What is claimed is:

1. A computer-program product tangibly embodied in a non-transitory machine-readable storage medium, the computer-program product including instructions operable to cause a computing system to generate a first feature for a machine learning model by:

receiving identification of character data;

wherein the character data is stored in a database that the computing system is not authorized to access;

wherein the database comprises multiple documents comprising the character data;

wherein one or more documents of the multiple documents pertain to a respective entity of multiple entities; and wherein the character data comprises identifying information that identifies a given entity when disclosed or misused;

extracting a subset of the character data, wherein the extracting excludes the identifying information;

generating structured data from the subset of the character data by:

generating multiple structured data terms; and storing the multiple structured data terms in respective data elements of multiple memory blocks in memory of the computing system;

generating the first feature for the machine learning model based on one or more of:

at least two structured data terms in different memory blocks of the multiple memory blocks; and data manipulation of a structured data term in a memory block of the multiple memory blocks;

generating a virtual, private environment specific to the machine learning model, wherein the virtual, private environment specific to the machine learning model protects included structured data terms used in generating the first feature from users without access to the virtual, private environment specific to the machine learning model; and generating, using the first feature, the machine learning model in the virtual, private environment specific to the machine learning model.

2. The computer-program product of claim 1, wherein the instructions are operable to cause the computing system to:

store the first feature in the memory of the computing system, wherein the memory of the computing system is authorized for access by the computing system and remote from the database;

determine the first feature is a candidate for an independent variable of a machine learning model; and generate, using the first feature, the machine learning model, wherein the first feature is an independent variable of the machine learning model.

3. The computer-program product of claim 1, wherein the database comprises a plurality of documents each associated with one of the multiple entities;

wherein the generating the first feature for the machine learning model comprises generating based on at least the data manipulation of the structured data term in the memory block of the multiple memory blocks; and wherein the instructions are operable to cause the computing system to:

store the first feature in the memory of the computing system, wherein the memory of the computing system is authorized for access by the computing system and remote from the database;

determine the first feature is a predictive indicator for machine learning model to make one or more predictions for the multiple entities; and generate, using the first feature, the machine learning model for making one or more predictions for the multiple entities.

4. The computer-program product of claim 1, wherein the database comprises a respective sets of multiple documents, where each respective set of the multiple documents is associated with one of the multiple entities; and wherein the instructions are operable to cause the computing system to:

store the first feature in the memory of the computing system, wherein the memory of the computing system is authorized for access by the computing system and remote from the database;

determine the first feature is a predictive indicator for machine learning model to make an approval computer-generated recommendation or a disapproval computer-generated recommendation for a new entity that is not a member of the multiple entities;

generate, using the first feature, the machine learning model for making one or more computer-generated recommendations for the multiple entities; and generate, based on the machine learning model, the approval computer-generated recommendation for the new entity that is not a member of the multiple entities.

5. The computer-program product of claim 1, wherein the receiving the identification of the character data comprises receiving via a graphical user interface;

wherein the database comprises a respective sets of multiple documents, where each respective set of the multiple documents is associated with one of the multiple entities; and wherein the instructions are operable to cause the computing system to:

generate, using the first feature, the machine learning model for making one or more predictions for the multiple entities;

generate, based on the machine learning model, a scorecard data model accessing a prediction for a first entity that is not a member of the multiple entities;

store the scorecard data model; and display, in the graphical user interface, one or more graphical representations of the scorecard data model.

6. The computer-program product of claim 1, wherein the extracting the subset of the character data comprises:

generating identifiers; and associating the subset of the character data that is related to a particular entity of the multiple entities with a respective identifier of the identifiers; and wherein generating the structured data from the subset of the character data comprises:

storing the identifiers in a memory block of the multiple memory blocks; and associating data in other memory blocks of the multiple data blocks to the identifiers, wherein the associating links data related to a same observation and disassociates data from a particular entity of the multiple entities.

7. The computer-program product of claim 1, wherein the generating the multiple structured data terms comprises generating headers for respective memory blocks for categorizing the multiple structured data terms; and wherein generating the first feature comprises:

determining a subset of the headers; and generating the first feature from the subset of the headers pertaining to the at least two structured data terms in the different memory blocks of the multiple memory blocks.

8. The computer-program product of claim 1, receiving an adequacy or relevance limitation for data collection; and wherein the generating the multiple structured data comprises changing granularity of the character data such that the multiple memory blocks complies with the adequacy or relevance limitation for data collection.

9. The computer-program product of claim 1, wherein the generating the first feature for the machine learning model comprises:

determining there are missing values for structured data; and generating computer-generated values for the missing values for the structured data; and wherein the instructions are operable to cause the computing system to:

generate a machine learning model using the first feature and one or more computer-generated values of the computer-generated values.

10. The computer-program product of claim 1, wherein the instructions are operable to cause the computing system to:

generate an assessment of the machine learning model; and display the assessment of the machine learning model in a graphical user interface for user selection of the machine learning model.

11. The computer-program product of claim 1, wherein the instructions are operable to cause the computing system to:

obtain a time period;

determine a first set of multiple entities based on the time period;

generate, using the first feature, the machine learning model;

determine a second set of multiple entities based on an updated time period, wherein the first set of multiple entities and the second set of multiple entities comprise different members; and generate an updated feature or updated machine learning model based on updated ones of the multiple entities according to the updated time period.

12. The computer-program product of claim 1, wherein one or more documents comprise a plurality of documents;

wherein the plurality of documents comprise at least one document containing character data generated by a first entity; and wherein the first entity is a member of the multiple entities.

13. The computer-program product of claim 1, wherein one or more documents comprise a plurality of documents; and wherein the plurality of documents comprise at least one document containing character data generated about a first entity from a second entity;

wherein the first entity is a member of the multiple entities; and wherein the second entity is not a member of the multiple entities.

14. The computer-program product of claim 1, wherein the instructions are operable to cause the computing system to generate, based on the at least two structured data terms, the first feature for the machine learning model.

15. The computer-program product of claim 1, wherein the instructions are operable to cause the computing system to generate the first feature for the machine learning model based on:

a ratio comprising the at least two structured data terms, wherein the ratio obscures individual information for the at least two structured data terms;

an indexing based on the at least two structured data terms, wherein the indexing obscures individual information for the at least two structured data terms; or a scoring based on the at least two structured data terms, wherein the scoring obscures individual information for the at least two structured data terms.

16. The computer-program product of claim 1, wherein the instructions are operable to cause the computing system to generate, based on the data manipulation of a structured data term, the first feature for the machine learning model.

17. The computer-program product of claim 1, wherein the instructions are operable to cause the computing system to generate a feature for the machine learning model based on a count, total, or frequency pertaining to a structured data term.

18. The computer-program product of claim 1, wherein the instructions are operable to cause the computing system to:

generate the first feature for the machine learning model based on the at least two structured data terms; and generate a second feature for the machine learning model based on the data manipulation of the structured data term.

19. The computer-program product of claim 1, wherein the one or more documents comprise a plurality of documents generated by entities without authorized access to the database, and without authorized access to the computing system.

20. The computer-program product of claim 1, wherein the receiving the identification of the character data comprises one or more of:

receiving an electronic file containing the character data comprising the identifying information identifying the given entity;

receiving a location of the electronic file containing the character data comprising the identifying information identifying the given entity;

receiving an indication of a selection of the electronic file containing the character data comprising the identifying information identifying the given entity; and receiving, from the database, the character data comprising the identifying information identifying the given entity.

21. The computer-program product of claim 1, wherein extracting the subset of the character data comprises:

refraining from storing, in memory authorized for access by the computing system, the identifying information; or removing, from the memory authorized for access by the computing system, the identifying information prior to generating the machine learning model.

22. The computer-program product of claim 1, wherein generating the first feature comprises:

generating the first feature based on unique data different from the character data; and storing the unique data in memory that is authorized for access by the computing system, wherein the memory authorized for access by the computing system is devoid of the identifying information.

23. The computer-program product of claim 1, wherein the identifying information comprises personal data that could identify an identity or contact information for the given entity; and wherein extracting the subset of the character data comprises identifying, using text mining, the personal data.

24. The computer-program product of claim 1, wherein the identifying information comprises restricted or confidential information; and wherein extracting the subset of the character data comprises identifying, using text mining, the restricted or the confidential information.

25. The computer-program product of claim 1, wherein the instructions are operable to cause the computing system to obtain traits inherent to individuals;

wherein the identifying information comprises the traits; and wherein extracting a subset of the character data comprises identifying, using computer semantic text processing, text relevant to the trait in the character data.

26. The computer-program product of claim 1, wherein the instructions are operable to cause the computing system to:

dynamically allocate, based on text mining of the subset of the character data, at least one of the multiple memory blocks; and generate the first feature based on one or more structured data terms of the at least one of the multiple memory blocks.

27. A computer-implemented method comprising generating a first feature for a machine learning model by:

receiving identification of character data;

wherein the character data is stored in a database that a computing system is not authorized to access;

wherein the database comprises multiple documents comprising the character data;

wherein one or more documents of the multiple documents pertain to a respective entity of multiple entities; and wherein the character data comprises identifying information that identifies a given entity when disclosed or misused;

extracting a subset of the character data, wherein the extracting excludes the identifying information;

generating structured data from the subset of the character data by:

generating multiple structured data terms; and storing the multiple structured data terms in respective data elements of multiple memory blocks in memory of the computing system; and generating the first feature for the machine learning model based on one or more of:

at least two structured data terms in different memory blocks of the multiple memory blocks; and data manipulation of a structured data term in a memory block of the multiple memory blocks;

generating a virtual, private environment specific to the machine learning model, wherein the virtual, private environment specific to the machine learning model protects included structured data terms used in generating the first feature from users without access to the virtual, private environment specific to the machine learning model; and generating, using the first feature, the machine learning model in the virtual, private environment specific to the machine learning model.

28. A computing system comprising processor and memory, the memory containing instructions executable by the processor wherein the computing system is configured to generate a first feature for a machine learning model by:

receiving identification of character data;

wherein the character data is stored in a database that the computing system is not authorized to access;

wherein the database comprises multiple documents comprising the character data;

wherein one or more documents of the multiple documents pertain to a respective entity of multiple entities; and wherein the character data comprises identifying information that identifies a given entity when disclosed or misused;

extracting a subset of the character data, wherein the extracting excludes the identifying information;

generating structured data from the subset of the character data by:

generating multiple structured data terms; and storing the multiple structured data terms in respective data elements of multiple memory blocks in memory of the computing system;

generating the first feature for the machine learning model based on one or more of:

at least two structured data terms in different memory blocks of the multiple memory blocks; and data manipulation of a structured data term in a memory block of the multiple memory blocks;

generating a virtual, private environment specific to the machine learning model, wherein the virtual, private environment specific to the machine learning model protects included structured data terms used in generating the first feature from users without access to the virtual, private environment specific to the machine learning model; and generating, using the first feature, the machine learning model in the virtual, private environment specific to the machine learning model.

29. A computer-program product tangibly embodied in a non-transitory machine-readable storage medium, the computer-program product including instructions operable to cause a computing system to:

generate a feature for a machine learning model by:

receiving, via a graphical user interface, identification of character data wherein the character data is stored in a database comprises multiple documents;

wherein one or more documents of the multiple documents pertain to a respective entity of multiple entities;

generating structured data from the character data by:

generating multiple structured data terms; and storing the multiple structured data terms in respective data elements of multiple memory blocks in memory of the computing system; and generating the feature for the machine learning model based on one or more of:

at least two structured data terms in different memory blocks of the multiple memory blocks; and data manipulation of a structured data term in a memory block of the multiple memory blocks;

generate a virtual, private environment specific to the machine learning model, wherein the virtual, private environment specific to the machine learning model protects included structured data terms used in generating the feature from users without access to the virtual, private environment specific to the machine learning model;

generate, using the feature, the machine learning model in the virtual, private environment specific to the machine learning model;

generate, using the feature, the machine learning model for making one or more predictions for the multiple entities;

generate, based on the machine learning model, a scorecard data model for a first entity that is not a member of the multiple entities; and display, in the graphical user interface, one or more graphical representations of the generated scorecard data model.

30. The computer-program product of claim 1, wherein the character data comprises raw characters stored within the multiple documents in the database that the computing system is not authorized to access;

wherein extracting the subset of the character data comprises:

identifying a template for the computing system to map to a document of the multiple documents, wherein the template indicates a limitation for collection of any raw characters; and parsing the document to determine data to restrict in an unstructured format according to the limitation; and extracting given raw characters in the document in an unstructured format prior to generating the structured data.

* * * * *